United States Patent
O'Neill et al.

(10) Patent No.: US 11,196,810 B2
(45) Date of Patent: Dec. 7, 2021

(54) SYSTEM AND METHOD FOR DYNAMICALLY GENERATING A SITE SURVEY

(71) Applicants: Zachory O'Neill, Pleasant Hill, MO (US); Taylor Clark, Kansas City, KS (US)

(72) Inventors: Zachory O'Neill, Pleasant Hill, MO (US); Taylor Clark, Kansas City, KS (US)

(*) Notice: Subject to any disclaimer, the term of this patent is extended or adjusted under 35 U.S.C. 154(b) by 0 days.

(21) Appl. No.: 16/820,705

(22) Filed: Mar. 16, 2020

(65) Prior Publication Data

US 2020/0296163 A1    Sep. 17, 2020

Related U.S. Application Data

(60) Provisional application No. 62/818,946, filed on Mar. 15, 2019.

(51) Int. Cl.

| | |
|---|---|
| *H04L 29/08* | (2006.01) |
| *H04L 12/26* | (2006.01) |
| *G06F 15/16* | (2006.01) |
| *H04W 4/60* | (2018.01) |
| *H04W 4/38* | (2018.01) |
| *G06Q 10/00* | (2012.01) |
| *H04L 29/06* | (2006.01) |

(52) U.S. Cl.
CPC ........ *H04L 67/1097* (2013.01); *H04L 43/065* (2013.01); *H04W 4/38* (2018.02); *H04W 4/60* (2018.02); *H04L 67/42* (2013.01)

(58) Field of Classification Search
CPC ... H04L 67/1097; H04L 43/065; H04L 67/42; H04L 67/1095; H04L 67/125; H04L 41/0853; H04L 41/0843; H04W 4/38; H04W 4/60; H04W 4/024; H04W 4/21; H04W 4/02; H04W 4/80
USPC .......................................................... 709/224
See application file for complete search history.

(56) References Cited

U.S. PATENT DOCUMENTS

| | | | |
|---|---|---|---|
| 8,353,012 B2* | 1/2013 | Del Real ............ | G06F 21/6218 726/4 |
| 2001/0047274 A1* | 11/2001 | Borton ................... | G06Q 10/06 705/30 |
| 2002/0107873 A1* | 8/2002 | Winkler ................. | G06Q 10/20 |
| 2004/0128183 A1* | 7/2004 | Challey ................. | G06Q 30/02 705/7.32 |
| 2006/0262922 A1* | 11/2006 | Margulies ............. | G06Q 30/02 379/265.12 |

(Continued)

*Primary Examiner* — David R Lazaro
*Assistant Examiner* — Berhanu Shitayewoldetadik
(74) *Attorney, Agent, or Firm* — Arthur K. Shaffer; Intellectual Property Center, LLC

(57) ABSTRACT

The present invention includes a system and method for dynamically generating a site survey which includes an application server, a report server for transmitting reports, a datastore capable of storing a plurality of site survey section templates, each site survey section template associated with at least one site-specific feature; a site survey dynamically generated by the application server from the site survey section templates in response to a selection of at least one of the site-specific features and a client application associated with the survey device and configured for receiving the dynamically generated site survey.

10 Claims, 14 Drawing Sheets

(56) References Cited

U.S. PATENT DOCUMENTS

| | | | |
|---|---|---|---|
| 2008/0313006 A1* | 12/2008 | Witter | G06Q 30/0601 705/7.17 |
| 2010/0169958 A1* | 7/2010 | Werner | G06F 21/36 726/6 |
| 2010/0281355 A1* | 11/2010 | White | G06Q 30/02 715/222 |
| 2011/0112875 A1* | 5/2011 | Johnson | G06Q 10/10 705/7.11 |
| 2011/0208822 A1* | 8/2011 | Rathod | G06F 16/9535 709/206 |
| 2012/0197680 A1* | 8/2012 | Zircher, IV | G06Q 10/0631 705/7.25 |
| 2012/0284324 A1* | 11/2012 | Jarville | G06Q 30/0201 709/203 |
| 2013/0014153 A1* | 1/2013 | Bhatia | H04N 21/42203 725/24 |
| 2013/0048710 A1* | 2/2013 | Marsico | G06F 16/9554 235/375 |
| 2013/0094700 A1* | 4/2013 | Mellor | G06T 7/246 382/103 |
| 2013/0111323 A1* | 5/2013 | Taghaddos | G06F 40/174 715/223 |
| 2013/0191180 A1* | 7/2013 | Teo | G06Q 30/0203 705/7.32 |
| 2014/0231502 A1* | 8/2014 | Marsico | G06Q 30/0203 235/375 |
| 2014/0346222 A1* | 11/2014 | Mastykarz | G06F 21/602 235/375 |
| 2015/0039409 A1* | 2/2015 | Marsico | G06Q 30/0217 705/14.19 |
| 2015/0213023 A1* | 7/2015 | Weber | G06F 16/221 707/751 |
| 2015/0213484 A1* | 7/2015 | Amara | G06Q 30/0246 705/14.45 |
| 2015/0356482 A1* | 12/2015 | Whipple | G06Q 50/06 705/7.23 |
| 2016/0286351 A1* | 9/2016 | Glenn, III | G01S 5/021 |
| 2016/0300389 A1* | 10/2016 | Glenn, III | G01C 21/206 |
| 2017/0323316 A1* | 11/2017 | Wheeler | G06Q 30/0203 |
| 2018/0165656 A1* | 6/2018 | Tessler | G06Q 10/1095 |
| 2020/0296163 A1* | 9/2020 | O'Neill | H04W 4/60 |

\* cited by examiner

Fig. 1

New Survey

Sections

- 1. Basic Survey Info
  *0% complete*
- 2. Site Points of Contact
  *0% complete*
- 3. Atmospherics
  *0% complete*
- 4. Route
  *0% complete*
- 5. Site Information/Exterior
  *0% complete*
- 6. Site Interior
  *0% complete*
- 7. Site Security
  *0% complete*
- 8. Communication
  *0% complete*
- 9. Medical
  *0% complete*
- 10. Special Considerations/Notes
  *0% complete*

Options

- Rename Survey

GENERATE SLIDESHOW

Fig. 2

SYSTEM AND METHOD FOR DYNAMICALLY GENERATING A SITE SURVEY

CROSS-REFERENCE TO RELATED APPLICATION

The present application claims the benefit of the prior filed U.S. provisional application filed on Mar. 15, 2019, Ser. No. 62/818,946 which is currently substance of which is incorporated herein.

FIELD OF THE INVENTION

The present invention is broadly directed to a system and method for dynamically generating a site survey of a physically remote geographic location using survey devices including handheld devices and sensory devices and more particular to a system and computer-implemented method for dynamically generating an dynamic site survey which is generated from an application server and transmitted to a team leader for dynamic distribution to a plurality of handheld devices associated with various team member and allows for the integration of survey data along with real-time data from the plurality of survey devices for report generation and real-time display of the site from a remote location. Generally, the survey data includes geographic, security, logistic and social data which can be scaled to display the remote location with real-time data allowing for a virtual walk-through of the remote location allowing the users to assess operational concerns related to a quantifiable objectives.

BACKGROUND OF THE INVENTION

In today's world people and nations are under constant threat from domestic and foreign actors which can undermine various aspects of daily life. Some threats are simply potential, others are actual. Some are in the long-term future; others are more immediate. As a result, there is a need for being able to conduct an immediate threat and safety assessment based upon targeted activity originating at a remote geographic location. The determination to target a remote location including, but not limited to, an area, complex, installation, force, equipment, capability, function or behavior is often based upon intelligence which is collected at a country, area, installation, agency, or person level. In some cases, forces are combined to act upon a target by the integration and coordination of land, sea, air, space and special operational assets in the target detection and engagement cycle. Often to accomplish a specific objective, different forces must be synchronized which can complicate the operational parameters used in achieving the target objective. Gathering, organizing and distributing all necessary information between various forces in a graphical manner visible among the various parties can be difficult.

In assessing a target objective, information must be collected to ensure that target development, pre-strike and post-strike requirements are integrated into a survey for proper analysis of the specific target and to prepare the necessary resources to accomplish the target objective. During analysis, the collected information must be validated and, if necessary, revalidated before presenting to the appropriate coordinated bodies for vetting as they build a consensus to deploy specific operational resources to accomplish the desired objective. Once the operational objectives are agreed upon, the target nomination lists and associated forces are vetted between the coordinated bodies and operational tasks are developed and assigned related to the available resources. The ability to validate, review, revalidate, assign the information resources, and operations can be time consuming and difficult as each force reviews and analyzes the collected information.

In addition, military and safety personnel are provided a limited advance information in which potential targeted activities are on-going. In some cases, time sensitive targets are categorized as emerging, perishable, high payoff, short dwell or critical-mobile. The ability or inability to act upon new information can be the difference between preventing or responding to a catastrophic event. In some cases, the new information is insufficient to develop an operational objective, must be revalidated or new information is necessary in order to properly assess the current situation and develop an operational methodology to achieve the desired objective. However, the delay and cost to organize and deploy personnel and equipment to a remote location can take weeks which when added to the time needed to conduct the safety and threat assessment can result in "stale" information. This time can result in lost opportunities while the remote personnel obtain additional information about the remote location using sophisticated sensory equipment.

Integrating various coordinated bodies in the command and control phase including the information collection process, validation, analysis, review and deployment stages to identify, assess and achieve operational objectives in a time sensitive targeting is difficult. In addition, once a target objective is determined, monitoring operational activity and assigning resources to the relevant body on a near real-time basis may be challenging based upon the changing operational environment in which the operational objective is operating. Thus providing a way to collect, review, validate, refine, display, assign, and monitor near real-time information, would be beneficial to achieving operational objectives in a changing, time-sensitive operational environment increasing the likelihood of a successful deployment while mitigating the effect of a changed or invalid parameter upon the users of the system and method.

Current systems do not allow for use of interconnected remote data and information collection equipment which allows for the collection and integrated display of near real-time information related to an operational target while allowing for resource allocation and reallocation which may become necessary while monitoring the operation. Some current systems only offer assistance before or during the operation and not during both. Other systems do not allow for an integrated system which allows all relevant organizational bodies to review, assess and monitor while an operation is occurring, or after an incident has already occurred. Current systems do not provide pre-operational intelligence, current operational intelligence and post-operational intelligence with the objective of achieving the coordinated operational objective vetted between the various bodies. Therefore, there is a need for systems and methods that overcome at least some of the deficiencies indicated above.

SUMMARY OF THE INVENTION

The foregoing needs are met, to a great extent, by the present invention, wherein one aspect a system and method are provided which will in some embodiment allow for system configuration, data entry, data storage and retrieval, presentation, survey, management, monitoring and feedback as desired.

In one embodiment, a system is provide which includes an application server for generating and recording site surveys a report server in communication with said application server and configured for transmitting reports for reviewing site surveys; a datastore in communication with said application server and capable of storing a plurality of site survey section templates, each site survey section template associated with at least one site-specific feature; a site survey dynamically generated by said application server from said site survey section templates in response to a selection of at least one of said site-specific features; a communication interface allowing communication between a survey device and said application server; a client application associated with said survey device and configured for receiving said dynamically generated site survey; survey data captured by said survey device using said client application and transmitted to said application server using said communication interface; a report generated by said report server with survey data received from said survey device; and said survey device further comprising: an input mechanism associated with said desired data type and configure for receipt of said survey data; a storage media for storing said survey data; a transmitter in communication with said client application; and a processor for processing said desired input data for transmission by said transmitter to said client-application as survey data In another embodiment the system includes, an application server for hosting a site survey application for dynamically generating a site survey for collecting site survey data and for automatically generating a site survey report based on the receipt of site survey data, the application server in communication with an admin server for user and system configuration, and a datastore for housing a library of historical site survey data, a library of site survey templates, a library of site survey section templates the application server being in networked communication for the transmission of the dynamically generated site survey to a plurality of survey devices including handheld devices associated with a survey team for conducting a site survey and accumulating site survey data which is then aggregated by a team leader for transmission to the application server. Generally, the system is configured for receiving data from plurality of survey devices for conducting a dynamic survey where each of the remote devices receives an alert when they are within a distance of an operational target.

In one embodiment, the system is configured for use in creating geographic surveys based on a library of survey templates which are customizable for each system configured client or organization and which are based on a particular for survey type. In addition, the system includes a number of section templates which can be dynamically added to a survey based on the specific survey being performed.

BRIEF DESCRIPTION OF THE DRAWINGS

FIG. 1 is a system block diagram illustrating various elements in accordance with an embodiment of the present system and method.

FIG. 2 is an exemplary illustration of an administrative user dashboard screen illustrating use of the current system to manage and configure various users, teams, surveys, survey templates, vulnerabilities and sensors in accordance with an embodiment of the present system and method.

DETAILED DESCRIPTION OF THE INVENTION

Figure 3:
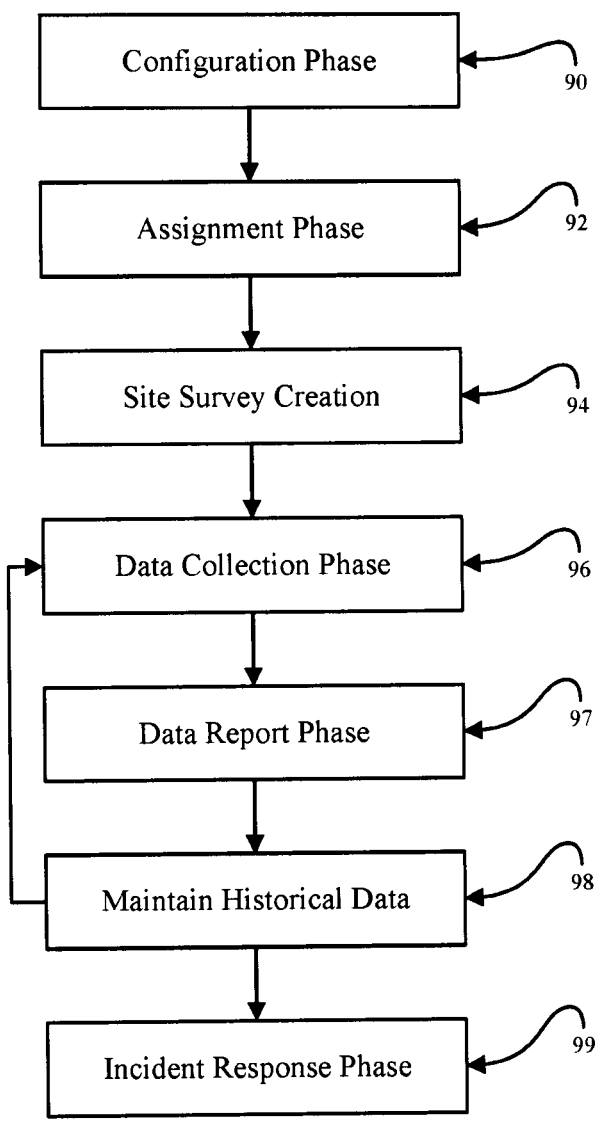
FIG. 3 is an exemplary embodiment of a computer-implemented method illustrating various steps in accordance with an embodiment of the present system and method.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Embodiments of the present invention provide a system generally referred to herein as reference number 10 and a computer-implemented method in association with storage media for dynamically creating a site survey 30 from a template library 51 of previously configured site survey templates 54. System generated site surveys 30 are dynamically generated based upon operational or logistic features of a specific geographic location.

Figure 1:
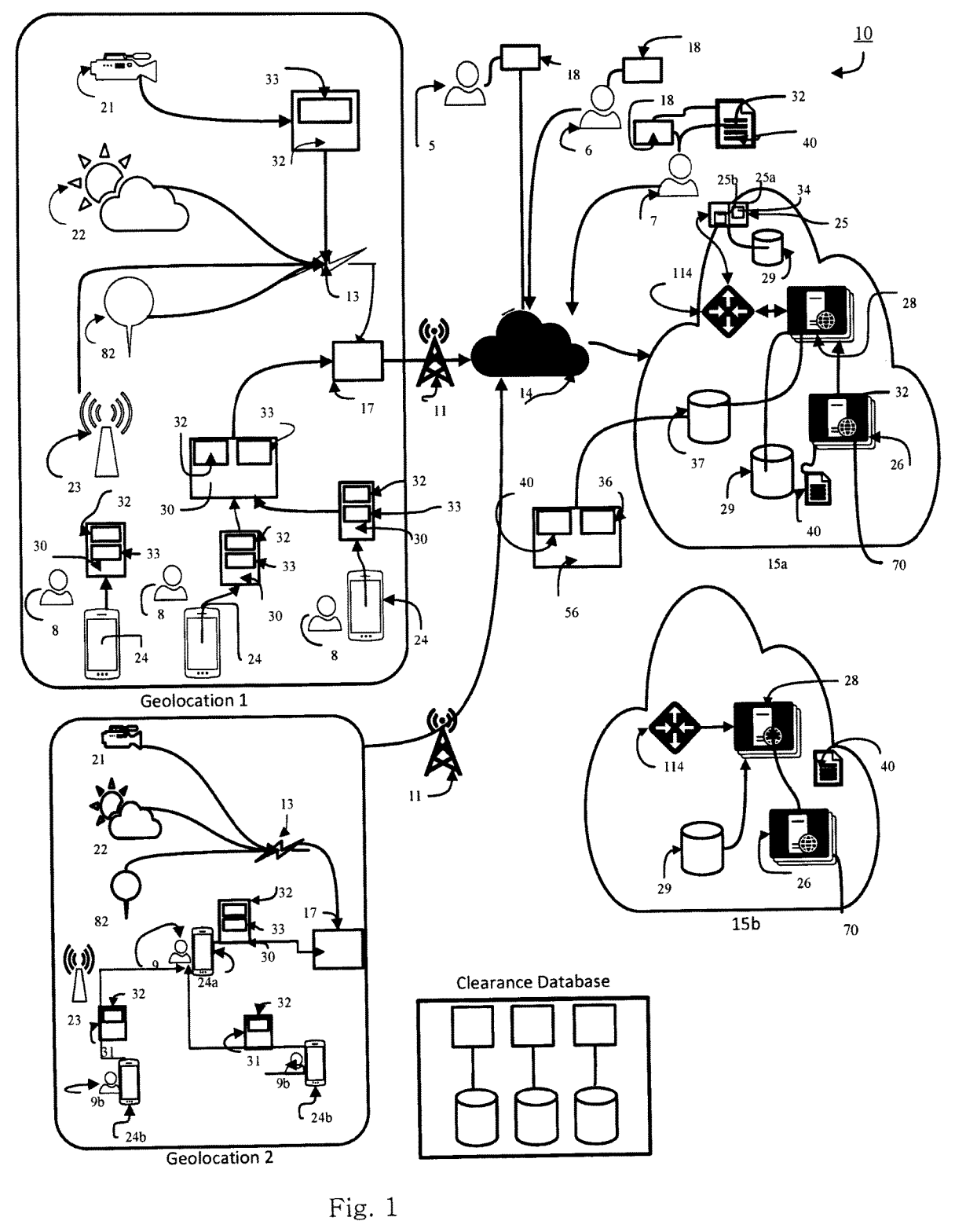

According to the embodiment of the system illustrated in FIG. 1, the system and method utilize a plurality of interconnected survey devices 19 including remote sensing devices such as PDA, smartphones or handheld electronic devices connected via a communications network to a remote computing device 18 which has at least one auto replicating database 29 and additional connectivity to a plurality of devices with a display and various input devices. Some of these devices will utilize a computer processor containing a computer application with a set of parameters and input sensors for recording, collecting, gathering, organizing various features of the target. Thus, for example, the computer application may include cross-platform java applications for example which are designed to operate in a standalone environment or a cloud based application designed to operate with a computer application contained on a centralized, connected application server 28 or web based browser which has an encryption protocol for all or part of the system or method for obtaining information which can be integrated using standard dynamic exchange mechanisms for linking object data and embedding that data into a display document such as PowerPoint by Microsoft.

The illustrated communication networks generally includes a plurality of entry points for users to connect networked devices including sensors, servers, workstations, computers, Personal Digital Assistants (PDAs), Cellular Telephones, and GPS Systems for sending and receiving survey related information.

The communications networks may include a variety of different network topologies, including a local area network 13, a wide area network 14, a cellular network 11, a cloud-based network 15, a virtual private network 16 or the like, to provide communication between a plurality of survey devices 19 to record and transmit survey data 32 through the network to a plurality of servers with connected databases 29 and or datastores 34 to retrievably store the survey data 32 and to dynamically generate a report 40 which includes the survey data 32 and device data 32g for display at a remote location and for retrieval at a subsequent time in response to a particular event.

In general, the system 10 includes an admin server 25 in communication with an application server 28 and a retrievable storage media including a datastore 34 which may include a relational database 29 for the organized storage of user data and organizational data. Additional databases may be provided for the retrievable storage of sensitive, classified, confidential or secret data. In this way, access to survey data can be limited based upon the user security authorization.

The admin server 25 generally performs system administrative functions like creating, adding or editing various system users, system accounts, setting up system devices and system traffic, configuring hardware for communication and configuring and enforcing various security and administrative system functions. By way of example, FIG. 1A illustrates an admin user 5 using an administrative screen in which the admin user 5 access the admin server 25 to configure various user accounts. The admin server 25 mentioned herein may be used to configured user accounts, register survey devices 19 and configure system components. The admin server 25 can be used to associate various system users with an organization or system administrative role. In addition, various non-administrative system users such as the report user 7 or survey user 8 can be associated with a previously configured organization and assigned to a particular team, a site survey, or associated with an organization along with a particular level of authorization. Once the user is setup, the system 10 will grant access to the user to utilize various system features and templates. As a result, for example, the survey user 8 will be granted authorization to access survey templates associated with the user's specific level of authorization.

In the depicted embodiment of FIG. 1, the system 10 includes at least one admin server 25 that includes a local processor 25a serving as the system processor, or at least a portion thereof, and one or more interfaces 25b to the wireless network. The admin server 25 is preferably a desktop computer but may include a mobile computer such as a notebook computer. The local primary and/or secondary storage device connected to the admin server 25 having sufficient storage media may serve as the datastore 34. Alternatively, portions of the datastore 34 may be provided by other systems capable of communicating with the admin server 25 such as relational database or a network addressable data storage (NAS device), local servers and/or wireless computers. The admin server 25 includes a system configuration application for configuring and managing system users, secured access to the system, system communication, system components, the application server 28 and the datastore 34.

The database 29 and datastore 34 provide the function of information storage. In addition to hardware, the functions may also involve various software application executed by various computing devices. The database 29 and datastore 34 may be included in, for example, one or more external storage devices connected to the system servers. Alternatively, the databases may be included in storage devices within the system servers themselves. The storage devices providing the database function may be any type of storage device, such as for example, CD-ROMs, DVD's, disk drives, magnetic tape, etc. The database 29 and datastore 34 may also be free standing or networked storage device which may also utilize auto-replication features to resize or replicated automatically as needed based on the desired network operating demands and geographic diversity of various system users. In this way, the information storage can be scaled as needed or distribute itself as needed to provide sufficient information storage capabilities. Generally, the datastore 34 provide storage media for the function of retrievable data storage and the database 29 provides the function of relational data storage where the stored data includes information about the relationship of the data which is also stored with the data onto a retrievable storage media. The database 29 may also be provided with an auto or manual scaling feature which allows it to be scaled automatically based on various user configured criteria or manually as desired. Generally, the database 29 and datastore 34 may be accessed by various system components and users including an admin user 5, a report manager 6 and a report user 7 as configured.

The database 29 may be used to store administrative logs, events or data associated with system activity. For example, the admin server 25 may generate an event when a new user is added to the system 10, when a site survey 30 is generated, when a site survey 30 has been completed, or when a survey report 40 is transmitted to the report server 26. Further, the database(s) 29 mentioned herein may store information about the site surveys 30 including survey data 32 from completed site survey 30s, including user information, device information, date and time information, user annotations, survey updates, access to historical surveys, and various communications between system users.

The application server 28 provides the function of generating and recording electronic site surveys through a remotely executing client application, managing the site surveys 30 and provides for the management and configuration of new survey templates 54 and new survey template sections 55 for retrievable storage within a survey template library 51 and a survey section template library 52 and for configuring and managing new survey devices 19 from a survey device template library 53. The application server 28 is also in communication with the report server 26.

The application server 28 includes a survey management application for configuration and managing electronic site surveys. As illustrated in FIG. 1, the application server 28 is in communication with the admin server 25 which authenticates user access based on the parameters established on the admin server 25 when configuring the user account. Once a user logs into the system 10, the system will authenticate the user and the device before granting access to system features. Based on the configured access, most users, survey device(s) 19 and system components will have limited access. In addition, the user's organization affiliation will also impact the user's access to the system, system stored data and generated reports. Generally, the permitted access will correspond to the security classification of each user based upon the applicable organization's security parameters.

The application server 26 is used to configure and facilitate various site survey application functions like creation and use of the site survey templates 54, creation of site survey template sections 55 and creation and/or configuring a plurality of site survey templates referred to as a library of site survey templates 51 or a plurality of site survey template sections referred to as a library of survey sections 52. Generally, the electronic site survey templates 54, the electronic site survey template sections 55, the electronic library of site survey templates 51 and the electronic library of site survey template sections 55 are retrievably stored into the datastore 34 or a database 29. The application server 26 may interface with one or more other system components including locally connected or externally connected devices for sending or retrieving application information, for sending and receiving survey data, and for generating and sending electronic site surveys. This includes, but is not limited to, survey questions, a survey response, sorting the responses or generating a ranking based on the received survey data, position data, historical data, preferred response data, an address, an image, organizational data, wireless information data, device data, network data, or other data as discussed herein.

The report server 26 generally performs the function of configuration and management of an electronic library of report templates 44 which are configured for automatic generation upon the receipt of survey data 32 and for transmission of the report 40 to a remote computing device 18. Generally, the generated report 40 is associated with a site survey 30 during creation of the site survey template 54 based upon, at least one of the survey report templates 44 from the electronic library of report templates 44. Additionally, the report 40 may be divided into report sections each section corresponding to a site survey section 31. The report template 44 can be created by the application server 28 at the time of creating the site survey template 54 or at a different time using the report server 26 or the application server 28. The report manager 6, preforming the function of a manager and referred to herein as manager, may be granted access to the report server 26. The report server 26 generally allows for the review and display of the site survey report 40 and for requesting real-time data associated with a survey device 19 for review as part of the display of the report 40. In addition, the report server 26 may facilitate initiation of an electronic request 70 or command from within the report 40 to a survey device 19 or survey user 8 to obtain additional survey data 32. The report manager 6 may also generate additional reports from the report server 26 for transmission to various system users which relate to the site survey, the application or the system.

In operation, the application server 28 assists in the integration of data between various client applications and server applications in an integrated system operating environment. In general the client application is referred to as reference 70. In the case of the generating the report 40 or reviewing historical site surveys 56 the application server 26 may embed of a reference to a first data record, such as real-time survey data or a link to real-time survey data in the second data record such as a field in a report 40 which may be viewed within a report viewer application or a field within a historical site survey 56 which may be viewed within client application.

The integrated system operating environment is responsive to the invocation of the second application program or to an indication by a user of the second application program of an operation to be performed on the embedded first data to invoke either the first application program or a local handler designed to emulate at least some of the functions of the first application program and to provide the embedded reference to the first data through the first application or local handler. The first application or local handler will then open the first file or object, resolve the reference to the first data, and provide a current copy of the first data from the first file or object to the second application through the integrated operating environment's data transfer mechanisms. The updated copy of the first data will then appear in the second application.

To illustrate by way of example, Microsoft Windows provides two mechanisms for embedding or linking data from a first data file into a second data file. The first uses the Windows Clipboard to perform a copy and paste operation and the second uses Object Linking and Embedding (OLE) and Dynamic Data Exchange (DDE) to link a copy of the data from the first data file into the second data file. Both methods require that either the first application program that generated the first data file or a local handler capable of performing the required functions of the first application program be invoked for each embedding and updating of data and differ primarily in that OLE provides automatic invocation of the first application program while the clipboard requires that the user invoke the first application program manually.

FIG. 2 illustrates a portion of a site survey using a preconfigured survey template. Each site survey template 54 is configured to obtain different types of data associated with specific geographic or logistic features of the site survey location using a variety of survey devices 19 including sensors 20 and handheld devices 24 using a variety of data entry methods including check-the-box, free form, multiple choice, selection of an image file, sound file and user generated annotations.

The survey device 19 may be configured to provide real-time survey information to the datastore 34 for retrievable storage or directly to the application server 28 or remote computer 18 for ongoing collection, reviewing, monitoring and displaying of various on-site survey data 32.

In a non-exhaustive list, survey data 32 may include, but is not limited to a wide variety of different data types, including, but not limited to, position data 32*a*, user data 32*b*, chronological data 32*c*, environmental data 32*d*, strategic data 32*e*, video data 32*f*, device data 32*g*, audio data 32*h*, social data 32*j*, network data 32*k*, ambient data 32*m*, operational data 32n, logistic data 32p, contact data 32q, strategic data 32r or system data 32s, image data 32t, route data 32u, vulnerability data 32v and structural data 32w, facilities data 32x, personnel data 32y, occupational data 32z, a combination of any the data types or some other data type. For example, a handheld device 24 may be tasked with completing a section 31 of a site survey 30 which includes position data 32a to be captured with the GPS input mechanism associated with one handheld device 24.

The systems, methods, and media described herein utilize computerized surveys that are targeted to specific geographic locations based on a plurality of features or desired data types. The dynamic site surveys may include different types of survey questions, the answers to which may provide information about the site surveyed including geographic, operational, structural, logistic or strategic features. An exemplary site survey employing the dynamic site survey system 10 may be used to document the existing, historical or projected conditions or operations at a school, hospital, church, business, governmental facility, manufacturing facility, public gathering place, military target, and the like. In addition, an embodiment of the site survey may be utilized in responding to a military assessment application, first responder, active shooter application, a first-responder, fire application, an executive protection application and a disaster investigation, survey application. In some embodiments, the electronic dynamically generated site survey 30 may be made available online via the Web or another network which is accessible to a computing device 18, such as a desktop computer, a tablet or a mobile computing device. The site survey 30 may be conducted by an individual or a group of people arranged hierarchically for the purpose of coordinating survey devices 19 and obtaining responses and data from various sections of a site survey associated with a particular geographic location, environment, event, or route.

In some embodiments, the survey response may include captured data, input data, responses, annotations or comments provided by the surveyor 8, team member 9b, team leader 9 or a manager 6. The surveyor 8 may provide the survey data 32 using the client application on a survey device 19 such as a handheld device 24, sensor 20 or some other computing device 18 or another electronic data collection method which is capable of electronically capturing responses or data in response to survey questions, queries, requests or commands initiated within a client application in communication with the remotely located server.

Referring to the drawings in more detail, a typical embodiment of the present system 10 is illustrated in FIG. 1, with an electronic template library 51, at least one administrative server 25 with a processor in communication with multiple survey devices 19 including, but not limited to, handheld devices 24 and various sensors 20 including a video sensor 21, weather sensor 22, GPS sensor 82, Wi-Fi sensor 23 each being in networked communication with each other across remote locations 12 with various users including an admin user 5, report manager 6, report user 7 and a survey user 8 each having access to configure and utilize the present system 10 to create and review geographically oriented dynamically generated surveys 30 referred to herein as a site survey.

In a typical system 10 exemplary architecture may include a number of different environments including a number of different systems and methods for employing the inventive system. Many of these environments include typical LAN and WAN components along with wired and wireless devices. In one embodiment of the system 10, the hardware includes a server with a system processor, an auto-replicating database 29 or datastore 34 which is interfaced to one or more wireless and/or encrypted communications network over which electronic communications are transmitted and received.

In some configurations, interfaces to the wireless network such as Wi-Fi, 2G, 3G, 4G LTE and 5G, may be limited to one or more wireless receivers integrated within the hardware. In other configurations, the wireless interfaces may include one or more wireless transmitters as well as one or more transmitters. By way of example, if wireless transmitters are included, the survey device 19 may communicate over the LAN 13 using a wireless access point 17 or gateway 27. In addition, included wireless transmitters may be used to support one or more of the security measures described in greater detail below. In some configurations, the admin server 25 may, further include a wired connection (not shown) to ethernet allowing direct communication between the admin server 25 and systems connected to the wired portion of LAN.

Alternatively, the hardware components may include multiple survey devices 19 such as handheld or mobile devices 24 with different input mechanisms or sensors 20 and/or remain in communication with additional survey sensors 20 such as those previously described. Generally, each survey device 19 will include a local processor, a display, a storage media, an input mechanism and one or more communication interfaces to a wireless or wired network. Individual local processors in the aggregate may serve as the system processor for the input of survey data which is transmittable to a remote or locally attached datastore 34.

Generally, the system 10 will be configured for use with each survey device 19 and will be associated with a specific datatype which corresponds to the survey device 19, the input mechanism and desired datatype to be captured by the survey device 19. An exemplary computer-implemented method illustrated in FIG. 3 includes a configuration phase 90, an assignment phase 92, a site survey creation phase 94, a data collection phase 96, a data report phase 97, maintaining historical data phase 98 and an incident response phase 99 referred to herein as an action plan. The configuration phase 90 includes configuring the system 10 including utilizing the admin server 25 and the application server 28 to setup various system functionality and various templates. The assignment phase 92 includes assigning various devices and features to various site survey sections and assigning various users to various teams for use in conducting a site survey as well as assigning various survey devices 19 to various datatypes. The assignment phase 92 may also involve creating site survey templates 54, section templates 55, report templates 44 and device templates 53. The site survey creation phase 94 includes creating site surveys 30 from the site survey templates 54, section templates 55, report templates 44 and device templates 53. The data collection phase 96 includes transmitting the site surveys 30 to remote survey devices 19 including survey users 8 to collect survey data 32. The client application 70 will be involved in the data collection phase 96. The data report phase 97 will involve generating a report 40 and transmitting the report, including site survey data 32 for review by a remote manager 6. Maintaining the historical data phase will involve the electronic storage of site survey data 32 into sections associated with historical site survey data 36 and storing it in a historical datastore 37 for retrieval. The create an incident response phase 99 includes using the historical site survey data 36, developing a response to an event using the historical site survey data 36 organized into sections and transmitting various sections of the historical site survey data 36 along with any information about available survey devices 19 to responding personnel using the client application 60.

One exemplary embodiment of the computer-implemented method uses a plurality of handheld devices 24 with the site survey client application 60, presenting at least a portion of an electronic site survey 30 through the site survey client application for capturing survey data 32 which is transmitted to a datastore 34 for generating a report 40 and for the creation of an electronic library of historical site surveys 56. Using a dynamically created site survey 30 from a library of previously configured site surveys 51, a library of survey devices 19 and a library of previously configured survey sections 52 which are dynamically generated and transmitted to at least one handheld device 24a associated with a site survey team leader 9 which is then selectively transmitted to uniquely coded handheld devices 24b based upon device data 33 retrieved from the handheld device in response to a query. Each handheld device 24 is associated with each member 9b of the survey team for conducting a site survey 30.

The system 10, through an application on the admin server 25, associates each handheld device 24 with the associated user's id number and may include additional data like the user's identity the user's geographic data, classification data, the device id, the id of the sensor input mechanism 20d, the sensor type, and user's system role. The site survey section 31 may be automatically transmitted to the team member 9b upon completion of the input data for review, approval and for transmission to the report server 26 for generating the site survey report 40 based upon the preconfigured report template 44. In an exemplary method for practicing the computer-implemented site survey, control of each section of the site survey 31 is transmitted to a specific handheld device 24 while survey data 32 is captured for the site survey 30. Upon completion of the site survey 30, survey section control along with the site-specific survey data 32 is then transmitted to the team leader 9 or a managing member 6 for review and approval.

During survey of the geographic site, team members 9b can use their handheld device 24 for data entry or recording data. After completion of the site survey 30, the team leader 9 can send a site survey completion command 72 to any recognized site survey device 19, including to the handheld devices 24b of any team members 9b requesting control and transmittal of all non-transmitted site survey data 32. During the site survey 30, the team member 9b can utilize various site survey devices 19 including any sensors 20 associated with the handheld device 24 to obtain site survey data 32.

Upon completion of the site survey 30, the team member handheld device 24a or remote manager 6 can initiate a site survey command 70 through the client application to each of the survey devices 19. In this way, the system 10 can obtain real-time site survey data 32 using a plurality of survey devices 19, including handheld devices 24 and sensors 20 to capture site specific data. Upon completion of the site survey command 70, the survey devices 19 will transmit the site survey data along with the control of the site survey data through the client application to the team leader 9 or manager 6. After reviewing the received site survey section 31, the team leader 9 can approve or reject the received site survey section 31. The team leader 9 can transmit additional site section surveys 31 to the team member 9b until the data entry for the site survey 30 is complete.

Figure 4:
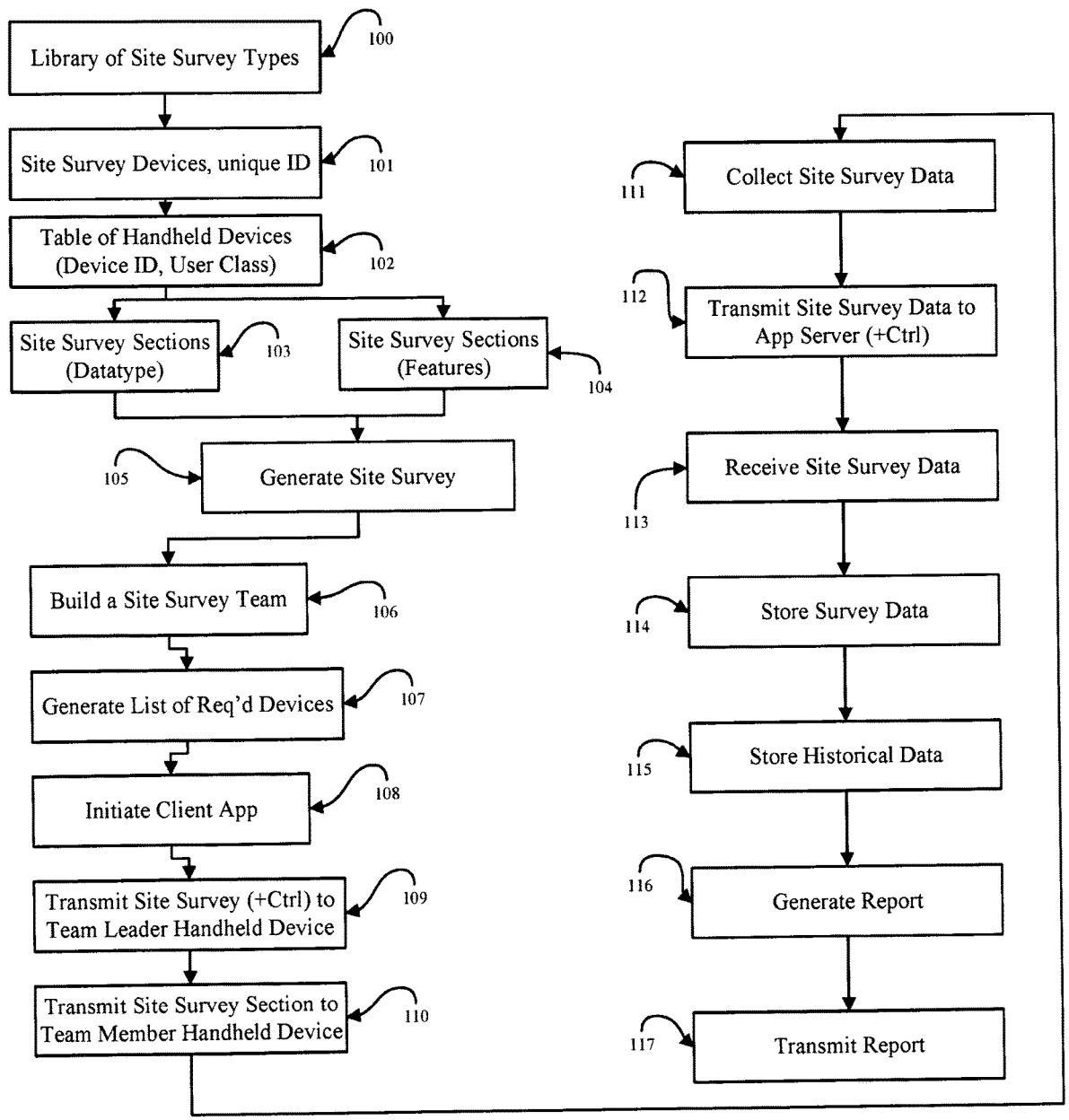
FIG. 4 is an alternative embodiment of a computer-implemented method illustrating various steps in accordance with an embodiment of the present system and method.

FIG. 4 provides another illustration of computer-implemented method for creating a dynamic site survey 30 to obtain site survey data 32 including (i) providing a library of site survey types 100, (ii) providing a library of site survey devices, each having a unique identifier 101, (iii) providing a table of handheld devices associated with the site survey devices including device type and user classification 102, (iv) providing a library of site survey sections associated with a desired site survey datatype 103, (v) provide a library of site survey sections associated with a site feature 104, (vi) generating a site survey having different sections from the library of site survey sections based upon a list of identifying features or datatypes 105, (vii) building a site survey team based on the table of handheld devices and site survey sensors 106, (viii) generating a list of required site survey devices, identifying any missing devices 107, (ix) initiating a client application on a handheld device for communication with the application server 108, (x) transmitting the site survey and control of the site survey to a handheld device associated with a team leader of the site survey team through the client application 109, (xi) transmit a section of the site survey to a handheld device associated with a site survey user 110, (xii) collects site survey data using the client application on a handheld device 111, (xiii) transmits collected site survey data, including sensory data, plus control of the site survey through the client application to the application server 112, (xiv) receive site survey data from handheld device through the client application at the application server 113, (xv) retrievably store site survey data, including survey data 114, (xvi) organize and retrievably store site survey data into historical site survey 115, (xvii) generating a report with site survey data along with hyperlink to access to any real-time data based on a preconfigured report template 116 (xviii) transmit the generated report, including site survey data and hyperlink to access real-time data and encoded commands to provide instructions to survey devices to the remote computer 117.

During the data collection phase 96, the system 10 determines what survey data 32 is required, what survey devices 19 are available and matches the survey section 31 to the survey device 19, based for example on the desired data and the available input mechanisms. The application server 28 then transmits the designated survey section 31 to the survey device 19 through the client application for data collection and local storage of the survey data 32 related to the assigned section 31. The system 10 may assign a specific survey section 31 to a specific handheld device 24 or a handheld device 24 associated with a specific sensor 20, a specific sensor 20, a plurality of sensors 20 or plurality of handheld devices 24 based on the ability of the handheld device 24 to provide the required survey data 32. Alternatively, the system 10 may assign an entire site survey 30 for completion to the survey device 19 having the most applicable instrumentation or associated with the most applicable instrumentation. Generally, the survey data 32 corresponds to captured data associated with the input mechanism 20d of the sensor 20 or the input mechanism 24g of the handheld device 24. In another aspect, the dynamic assignment of the survey section 31 by the application server 28 may be based on a selection of features associated with the site and the associated input mechanism 20d required to capture data about the selected feature.

Figure 5:
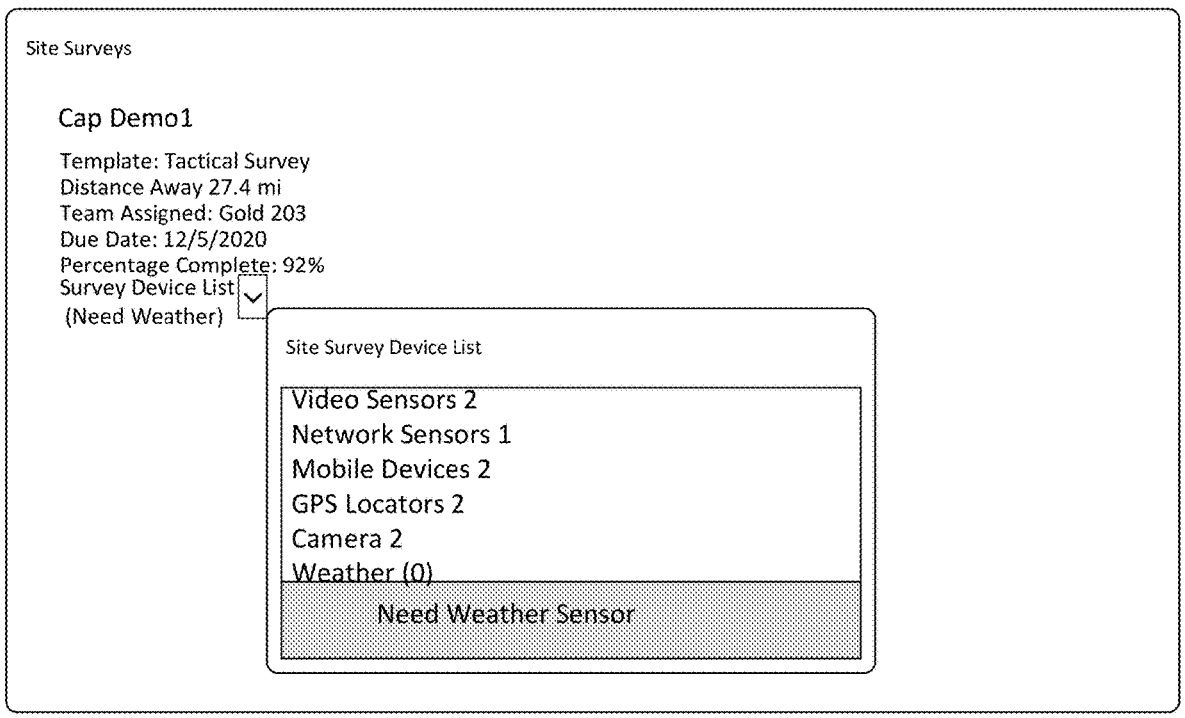
FIG. 5 is an exemplary illustration of a site survey screen in which the system indicates a list of sensors available and needed for conducing a site survey in accordance with an embodiment of the present system and method.

As further illustrated in FIG. 5, the system may generate a listing of site survey devices required and available for a particular site survey 30. If the survey 30 requires a particular type of survey data 32 from a survey device which is not available, the system 10 may generate an alert based on the need for additional or different survey devices 19.

As an example of the system 10, a section of a site survey may involve collecting site specific network data 32k. The system 10 will determine which sensor 20 or handheld device 24 has an input mechanism compatible with detecting network data. If no device has that ability, the system 10 may generate an alert to notify a manager 6 or team leader 9 that additional survey devices 19 are needed to complete the site survey 30. Once a survey device 19 with the necessary input mechanism has been assigned to the site survey team, the system 10 will determine which sensor 20 or handheld device 24 has a network detection input mechanism and dynamically assign the particular survey section 31 to the handheld device associated with the associated input mechanism to detect and obtain intra-device network communication data. In this way the system 10 can record and/or capture network device data like tcp/ip data along with MAC data about various devices associated with a particular geographic location as part of a site survey.

Figure 6:
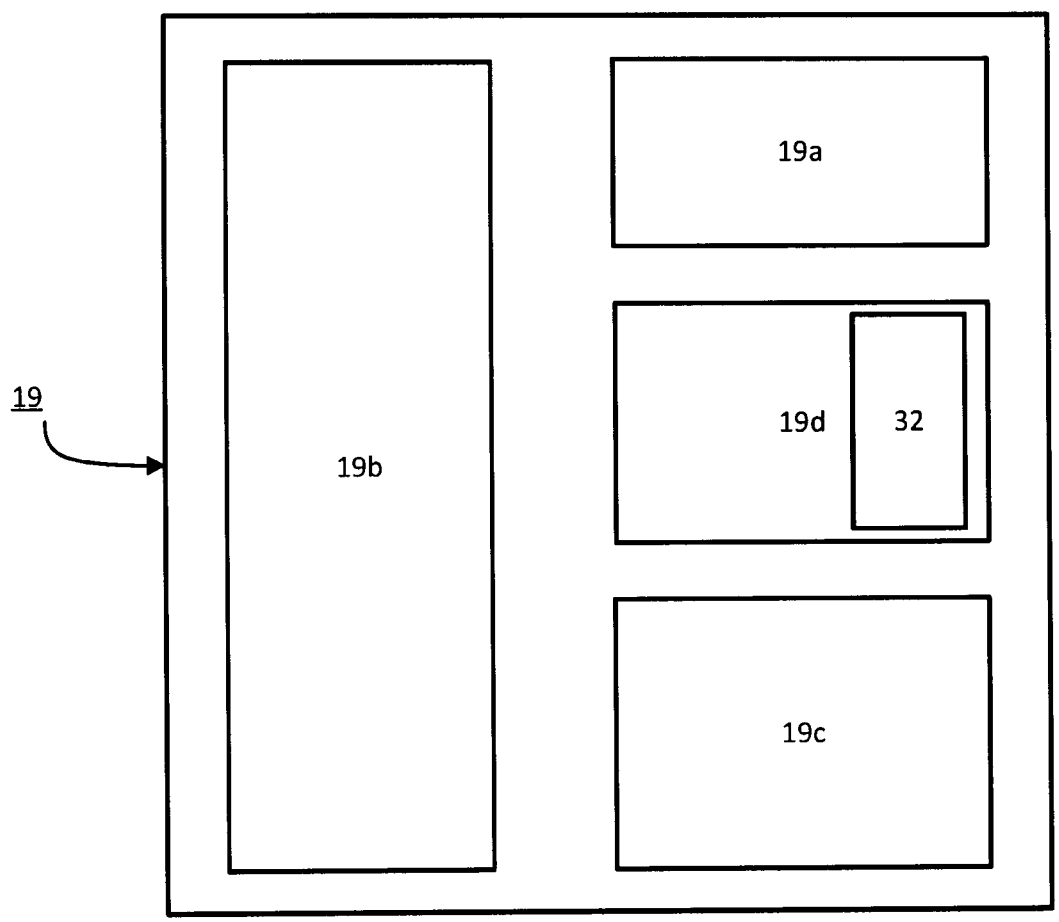
FIG. 6 is an exemplary functional block diagram of an exemplary survey device in accordance with an embodiment of the present system and method.

The remotely connected datastore 34 may include a combination of local storage and/or external storage devices. As described above, survey devices 19 include handheld devices 24 and sensor devices 20. As depicted in FIG. 6 each survey device 19 generally includes a processor 19a, a transmitter 19b, an input mechanism 19c and storage media 19d. The processor 19a functionality may be provided by a stand-alone processor within the survey device 19, or within a single or aggregate of survey devices 19. In addition, the survey device processor 19a functionality may be accomplished with a combination of survey devices 19 and one of the remotely located servers such as the admin server 25 or application server 28 to provide the processor and data storage functionality. The admin sever 25 and application server 28 may be in direct or indirect communication with a storage medium for the purposes of providing the datastore 34 for the retrievable storage of survey data 32 from the survey device 19 and for processing any received survey data 32; alternatively, the datastore 34 may be supported by some combination of the local storage among the survey devices 19, the local storage associated with the application server 28 and external storage available throughout the communications interface accessible via the transmitter 19b.

Figure 7:
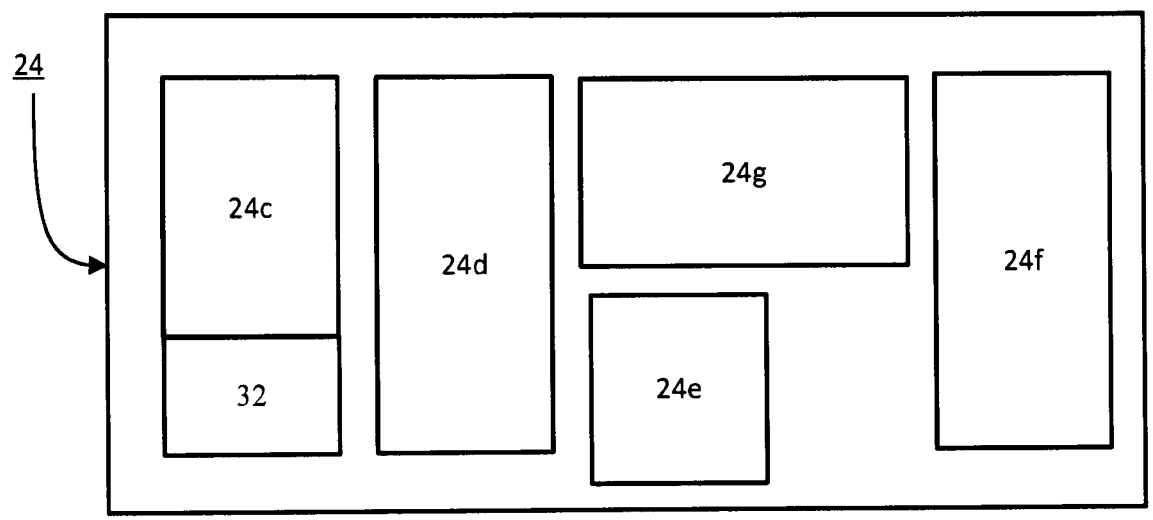
FIG. 7 is an exemplary functional block diagram of an exemplary handheld device in accordance with an embodiment of the present system and method.

As depicted in FIG. 7, each handheld device 24 generally includes at least a wireless receiver 24c, a transmitter 24d, input mechanism 24g, processor 24e and storage media 24c for local storage of survey data 32. The processor 24e is coupled to the storage media 24c and transmitter 24d for running the client application 60 which utilizes available input mechanisms 24g. Alternatively, the system 10 may include multiple handheld devices 24, along with a variety of different components or functionality in which the system 10 dynamically assigns different survey functions or survey sections 31 to each handheld device 24. As previously mentioned, the dynamic assignment of the survey section 31 to the handheld device by the application server 28 may be based on the sensor input mechanism 20d or handheld device input mechanism 24g.

Figure 8:
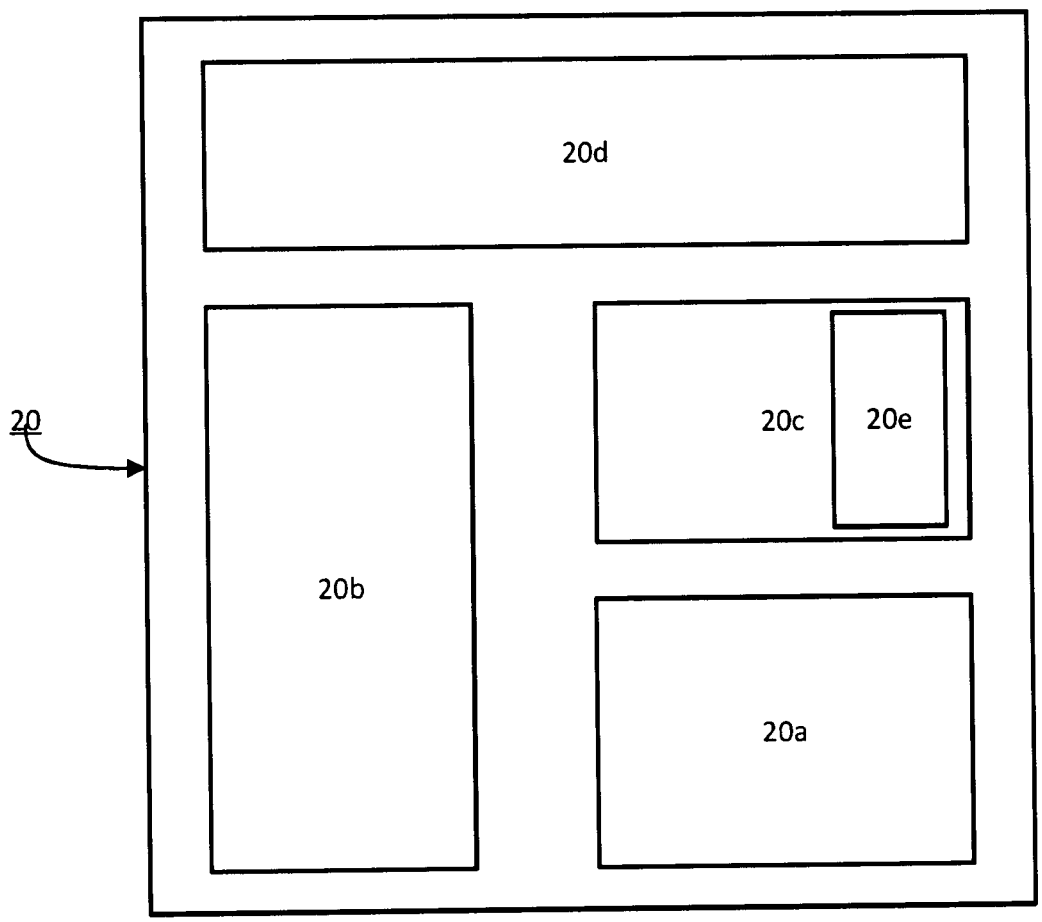
FIG. 8 is an exemplary functional block diagram of an exemplary sensor device in accordance with an embodiment of the present system and method.

As illustrated in FIG. 8, each sensor device 20 generally includes at least a wireless transmitter 20b, but may also include additional wireless receivers and/or wireless transmitters for communications, a processor 20a, storage media 20c for storage of received sensory data 20e and an input mechanism 20d. Each of the sensors 20 and handheld devices 24 may also include a wired connection (not shown) to a local area network 13. Finally, the survey devices 19 including the handheld devices 24 may also use existing interfaces and/or incorporate additional interfaces such as the E-UTRA or RRC protocol which may allow for peer-to-peer or peer-to-client communication among themselves utilizing various bandwidths utilized in Wi-Fi, RF, RFID and Bluetooth communications. Generally, the sensor 20 communication interface 20b may include wired or wireless communication interface for sending and receiving various types of sensory data 20e retrievably stored on a local storage media 20c to any nearby handheld devices 24 or to or from a remote computing device 18 over a wired or wireless communication interface which may also include a wireless receiver (not shown), a wireless transmitter (not shown) or both. Some of the communication interfaces may include an ad-hoc, mesh, client-to-client, client-to-server, peer-to-peer, peer-to-server, cloud-to-peer and cloud-to-server as the desired communication interfaces to achieve the appropriate communication interface to support this participation.

Figure 9:
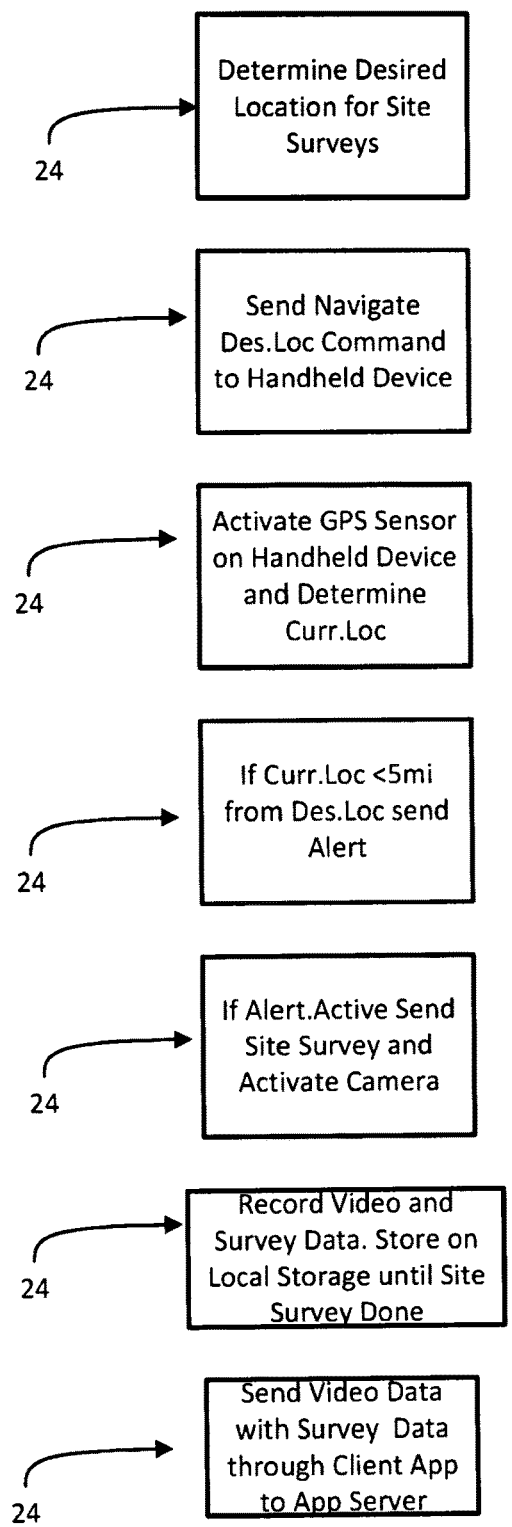
FIG. 9 is an exemplary functional block diagram of an exemplary handheld device in accordance with an embodiment of the present system and method.

One aspect of the system 10 and computer-implemented method illustrated in FIG. 9, involves the handheld device 24 being provided directional information to indicate a desired position, through for example a position sensor 82. Once the handheld device 24 comes within a preconfigured distance from a desired position, the survey device 19 may provide an audible or non-audible response based upon the proximity of the survey device 19 to the desired position. If configured, the survey device 19 may automatically begin obtaining survey data 32 upon reaching the configured proximity of the desired position. Examples may include generating an alarm on the handheld device 24 after arriving within 5 meters of the desired position. After generating the alarm, the handheld device 24 may initiate a remote camera operation, causing the handheld device 24 to begin recording video using the video sensor 21 associated with the handheld device 24 and storing the video data 32f on the local storage media. Upon completion of the site survey 30, the handheld device 24 may transmit the survey data 32 along with the video data 32f to the datastore 34.

Figure 10:
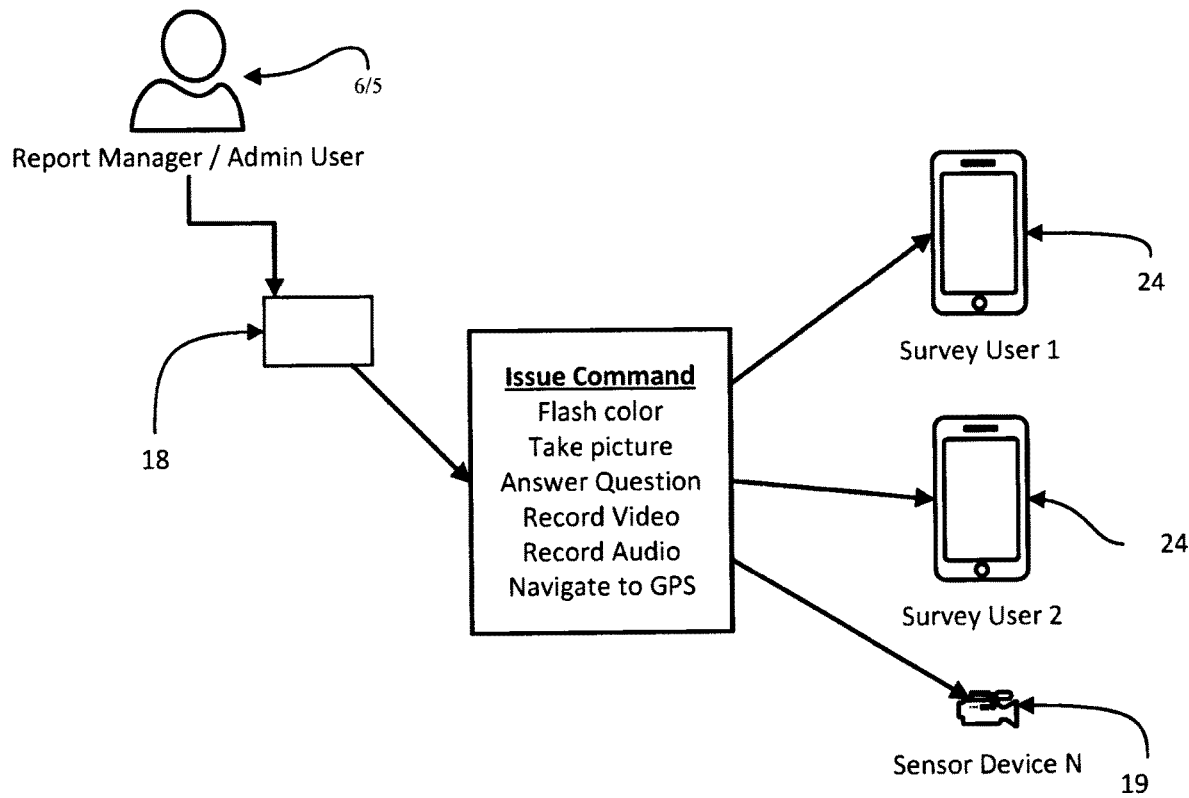
FIG. 10 is an exemplary process diagram illustrating an embodiment of the site survey command in accordance with an embodiment of the present system and method.
Figure 11:
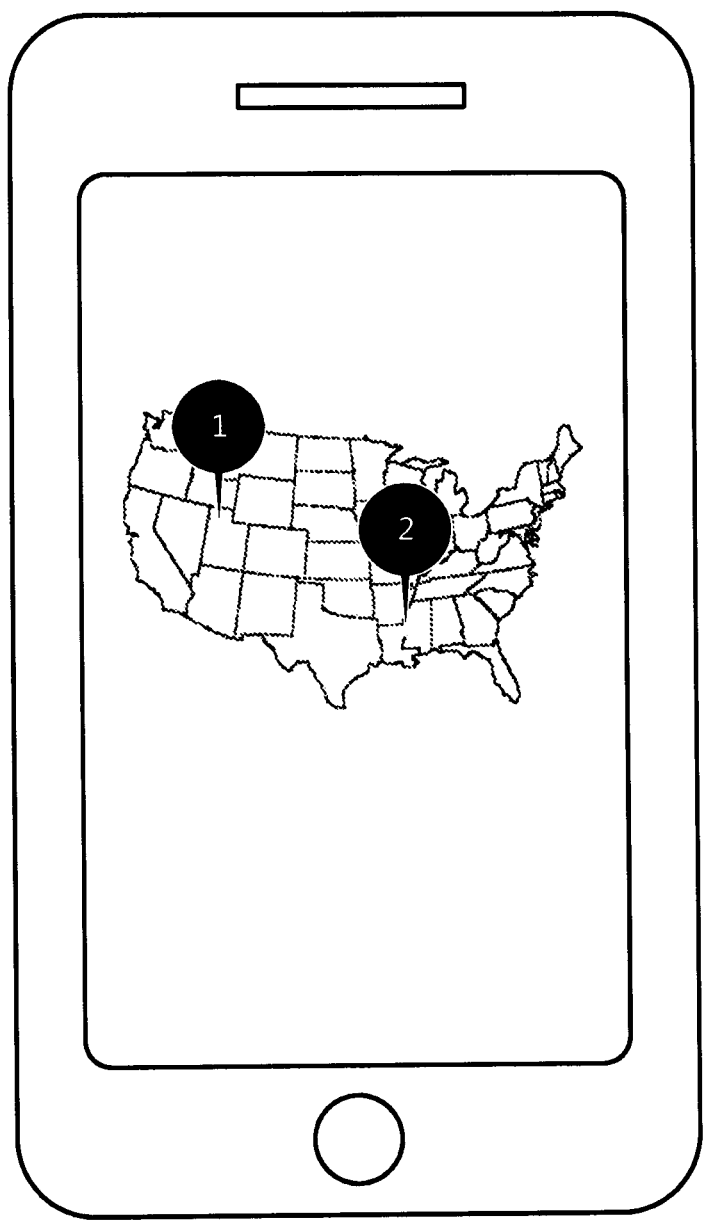
FIG. 11 is a graphical illustration of available site surveys arranged geographically on the client application in accordance with an embodiment of the present system and method.

As illustrated in FIG. 10, the system 10 may also transmit a site survey command 70 from a remote computing device 18 to a survey device 19 such as a handheld device 24. By way of example, the site survey command 70 may include, but is not limited to an instruction to the survey device 19 to capture a video, an image, providing additional responsive data to a particular survey question, navigate to a specific location or a command to display an image or color.

The manager 6 or team leader 9 can initiate an activation command which is transmitted via the associated network to the handheld device 24a to activate a pre-configured real-time sensor 20 associated with a responding team member's 9b handheld device 24b or in communication with a responding team member's 9b handheld device 24b to obtain real-time information from each team member 9b or all team members 9b. The real-time sensor 20 may include, but is not limited to, sensors 20 such as a visual sensor 21, temperature sensor 22, location sensor 82, heart-rate sensor, pulse sensor, audio sensor, visual sensor or auxiliary sensor associated with the handheld device 24 or other computing device 18.

The site survey command 70 may be presented to the manager or team leader 9 in the report 40. Once the report 40 is received, the manager 6 or other remote user viewing the reported site survey data 32 may utilize a computing device 18, including the reporting server 26, the application server 28 or the leading handheld device 24a to generate the site command 70 presented to the user by the report 40. One the site command 70 is executed, a command is transmitted through the client application to the relevant survey device 19 to execute the system generated site command 70. As illustrated in FIG. 10A, once the site command 70 is executed, an error message may be displayed which indicates that additional site information is needed or that the site information provided needs to be reconfirmed or rechecked. The site command 70 can be generated by the system 10 based on preconfigured thresholds or it may be a manual command generated by the remote computing device 18, the team leader's handheld device 24a or the application server 28.

In response to the receipt of additional information provided as a result of the site command 70, the report 40 may regenerate a visual display of the targeted site and the surrounding area featuring the newly collected survey data 32 which may include images, sounds, wireless and textual information surrounding the site.

The application server 28 may be configured for interconnection to third party systems and databases for the import and export of data. Some third-party systems, for example, may provide additional data about potential criminal activity, utility information, building or structural information, and/or computer identification or operational information. In addition, the report server 26 may be configured for interconnection to third party systems and databases which allow the system to export a report 40 to a third-party system. For example, the generated report 40 may be transmitted to a public assistance system for display and documentation purposes to determine eligibility for a public assistance award or grant.

An alternative aspect of the system 10 is also illustrated in FIG. 1 with a tiered arrangement of survey devices 19 illustrated at geolocation 2. In the illustrated arrangement of tiered survey devices 19 there is an embodiment a leading device 24a associated with a team leader 9, for example, in wireless communication with a wireless access point 17 and member handheld survey devices 24b are in wireless communication with the leading device 24a. In this arrangement, the leading device 24a is in communication with application server 28 through the wireless access point 17. For example, the leading device 24a may receive a site survey 30 from the application server 28 for selective redistribution to the member handheld devices 24b. The team leader 9 using the leading device 24a may then manually select which sections or portions of the site survey to forward to the team members 9b using the member handheld survey devices 24b. Alternatively, the system 10 may determine which sections should be assigned to team members based on the available sensors in the member handheld devices 24b. this aspect may be especially beneficial in a first responder situation.

Figure 12:
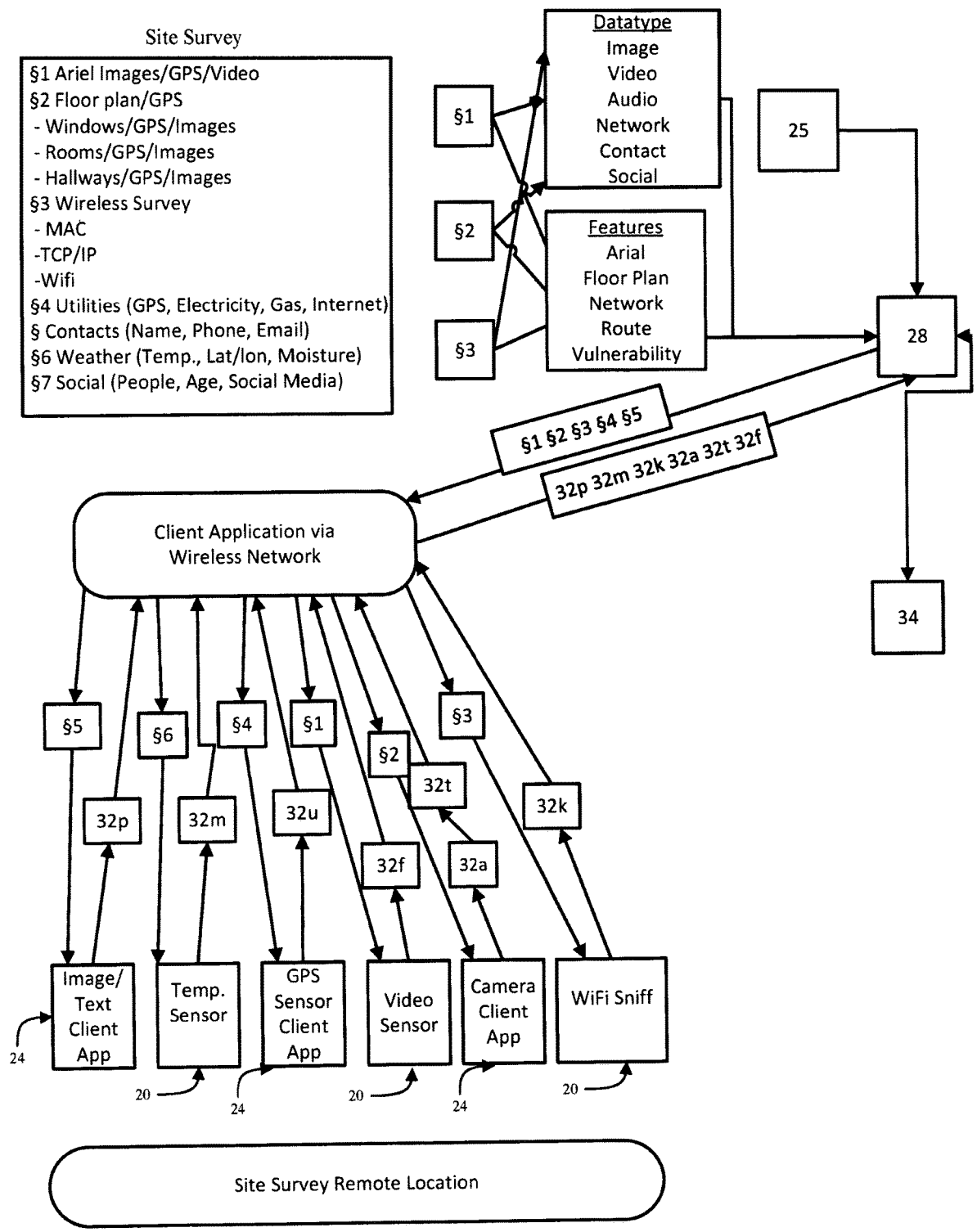
FIG. 12 is a process diagram illustrating an embodiment of the application server transmitting and receiving survey sections in accordance with an embodiment of the present system and method.

FIG. 12 illustrates an embodiment of the system 10, in which different sections of a site survey 30 get transmitted to different survey devices 19 based on the features of the site and the desired datatypes. In general, the handheld device 24 associated with the survey leader 9 receives the site survey 30 and distributes sections 31 to the various team members 9b based on the site features or configuration of the specific handheld device 24 associated with the various team members 9b. For example, one of the handheld devices 24 associated with a survey user 8 may include a position sensor 82 like a GPS sensor and another handheld device 24 associated with a different survey user may include a wireless RF sensor 23 which allows for scanning and identifying of various wireless devices nearby. In combination, different handheld devices 24 can provide GPS locations of site specific objects, a visual image file, an audio file along with device data 33 associated with nearby wireless devices which can then be recorded onto the survey member handheld device 24b as different site survey sections 31 which are aggregated by the survey leader device 24a for processing, review, approval and transmission to a remote computing device 18 at a different location.

In addition, the system 10 provides a library of historical site surveys 58 which are organized, classified and retrievably stored based on the various geographic features associated with the survey site. The historical site surveys 56 are divided into sections which can be classified according to various configured parameters which can be made accessible to a handheld device of a responding team leader 9 who can then can transmit individual or grouped sections of the historical site survey to responding users using the handheld device. Alternatively, the historical site survey 56 can also be transmitted to a remote computer 18 associated with a remote manager 6 who can review and transmit individual or grouped sections of the historical site survey 56 to the responding team members 9b.

Upon completion of the site survey 30, the survey leader device 24a in communication with the remotely located application server 28 with datastore 34 can transmit the completed site survey 30 with survey data 32 including sensory data 35 for storage by the datastore 34 for processing and report generation by the report server 26 and for storage as historical survey data 36 on a historical datastore device 37. Upon receipt of the survey data 32, the application server 28 can verify the integrity of the survey data 32. If configured, the application server 28 can then sort and rank the survey data 32 based upon a previously provided sorting criteria configured by the admin server 25. The sorting criteria can be used to process the survey data 32 and sort it based upon a hierarchical listing of site-specific objects which can be processed as part of the reporting function performed by the report server 26, or reviewed and sorted by the application server 26. Depending the results of the hierarchical listing, additional survey data 32 may be requested from an associated handheld device 24 or targeted survey sensor device 19.

Figure 13:
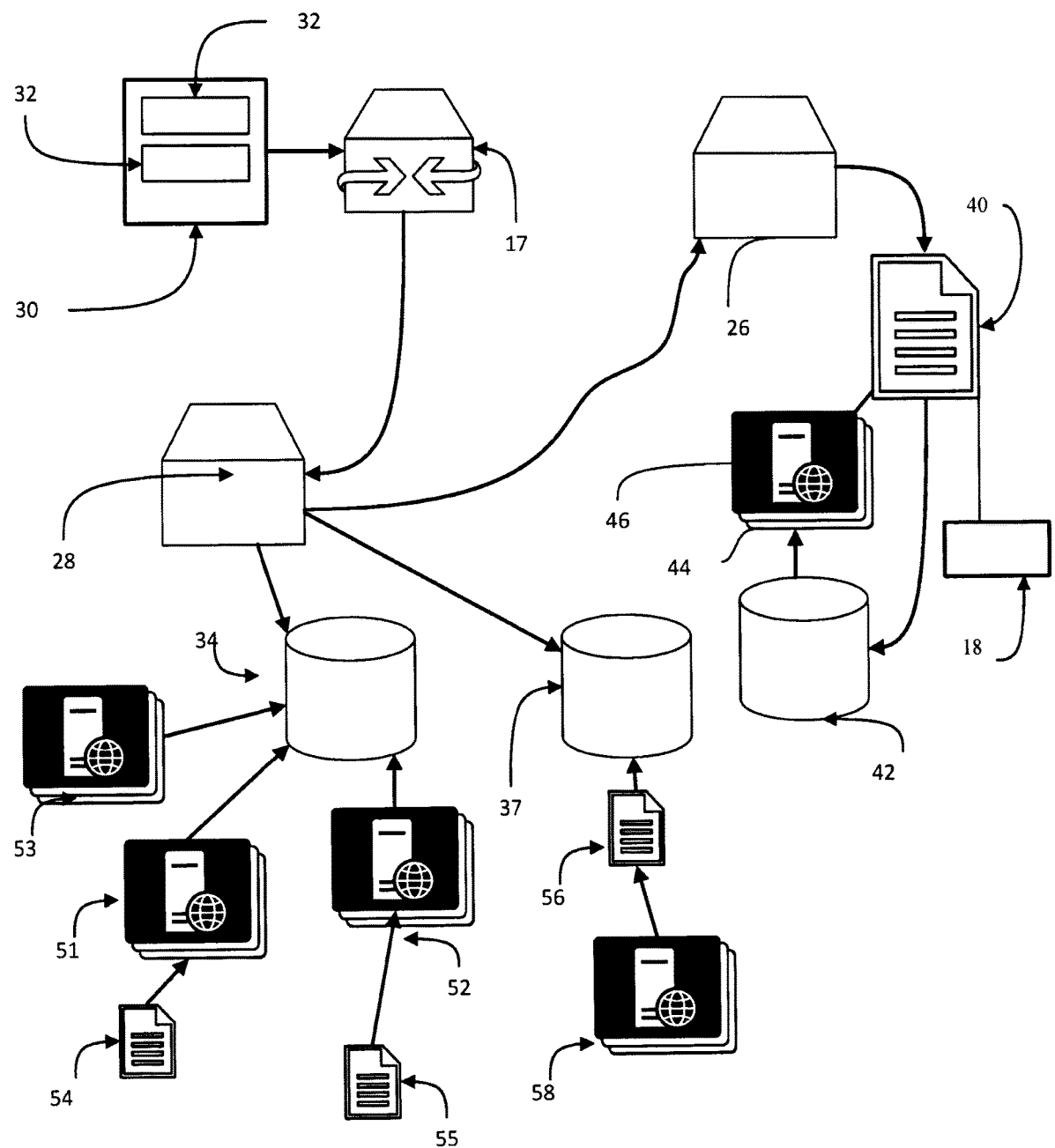
FIG. 13 is a process diagram illustrating an embodiment of the application server processing received survey data in accordance with an embodiment of the present system and method.

Storage of site survey data 32 is illustrated in FIG. 13 After receipt of the site survey data 32 by the application server 28 the survey data 32 is retrievably stored into the datastore 34 and a copy is also stored within the historical datastore 37. A copy of the survey data 32 may also be transmitted to the report server 26 for process and generation of the site survey report 40. In general, the report server 26 processes the survey data 32 and generates a report 40 which is retrievably stored within a report datastore 42 and a copy is transmitted to a remote computer 18 for display, review and approval by a manager 6. In addition, the manager 6 may request and review real-time data as part of the report and invoke a site survey command 70 through the report which is then transmitted from the report server 26 through the application server 28 to the wireless access point 17 to the appropriate survey device 19. In some configurations, the sensor device 19 may further include local processing capability and or local computing device such as a handheld device capable of providing these functions for the system 10.

As illustrated in FIG. 1, an embodiment of the system 10 includes hardware components include multiple survey devices 19, multiple networks and a remote admin server 25, an application server 28, a historical datastore 37 and a report server 26. In this configuration, the admin server 25 and survey devices 19 including the handheld devices 24 and sensor devices 20 provide a wide range of functionality utilizing a variety of features discussed above.

The information generated by the survey devices 19 is collected and stored as survey data 32. An block diagram illustration of the embodiment of the survey device 19 is illustrated in FIG. 8. As contemplated hereunder may be a standalone sensor device 19, a sensor device 19 in communication with a handheld device 24 or may be a component of one of the handheld devices 24. The survey data 32 may be transmitted in series, parallel or digitally as a stream of data and may be stored or contained within a datastore 34 as a table, a database 29 or other associated data records which includes a variety of data including survey data 32, user data 32*b*, the device data 32*g*, the system data 32*s* including the system components used for capturing, storage, transmission and receipt of the survey data 32. In addition, the survey data 32 can be encrypted during transmission, storage and access.

An embodiment of creating a survey template is illustrated in FIG. 2. Generally, when configuring, creating or adding new site survey templates the application server 28 allows for the creation or configuration of a new survey template 54, creation or configuration of a new survey template section 55. In addition, the report server 26 can be used to create a new survey report template 44, review, create or configure a new survey report 40, or review prior reports 40. The admin server can be used to manage or configure various system users including adding a new user, editing a user or removing a user.

One aspect of the computer-implemented method for using a plurality of survey devices 19 to create a library of historical site surveys 58 and using a dynamically created site survey 30 from a library of previously configured site survey templates 51, a listing of different types of survey devices 19 and a library of previously configured survey sections 52 which can be used to dynamically generate a site survey 30 which is transmitted to at least one survey device 19 associated with a site survey team leader 9 which is then selectively transmitted to uniquely coded handheld devices 24 based upon device data 33 retrieved from the handheld device 24 in response to a query and associated with each member 9*b* of the survey team for conducting a site survey 30. Generally, the admin server 25 provide for an association between each handheld device 24 and a system user which includes the user's identity and may include geographic data, classification data, device id, sensor id, sensor type, and user type.

Figure 14:
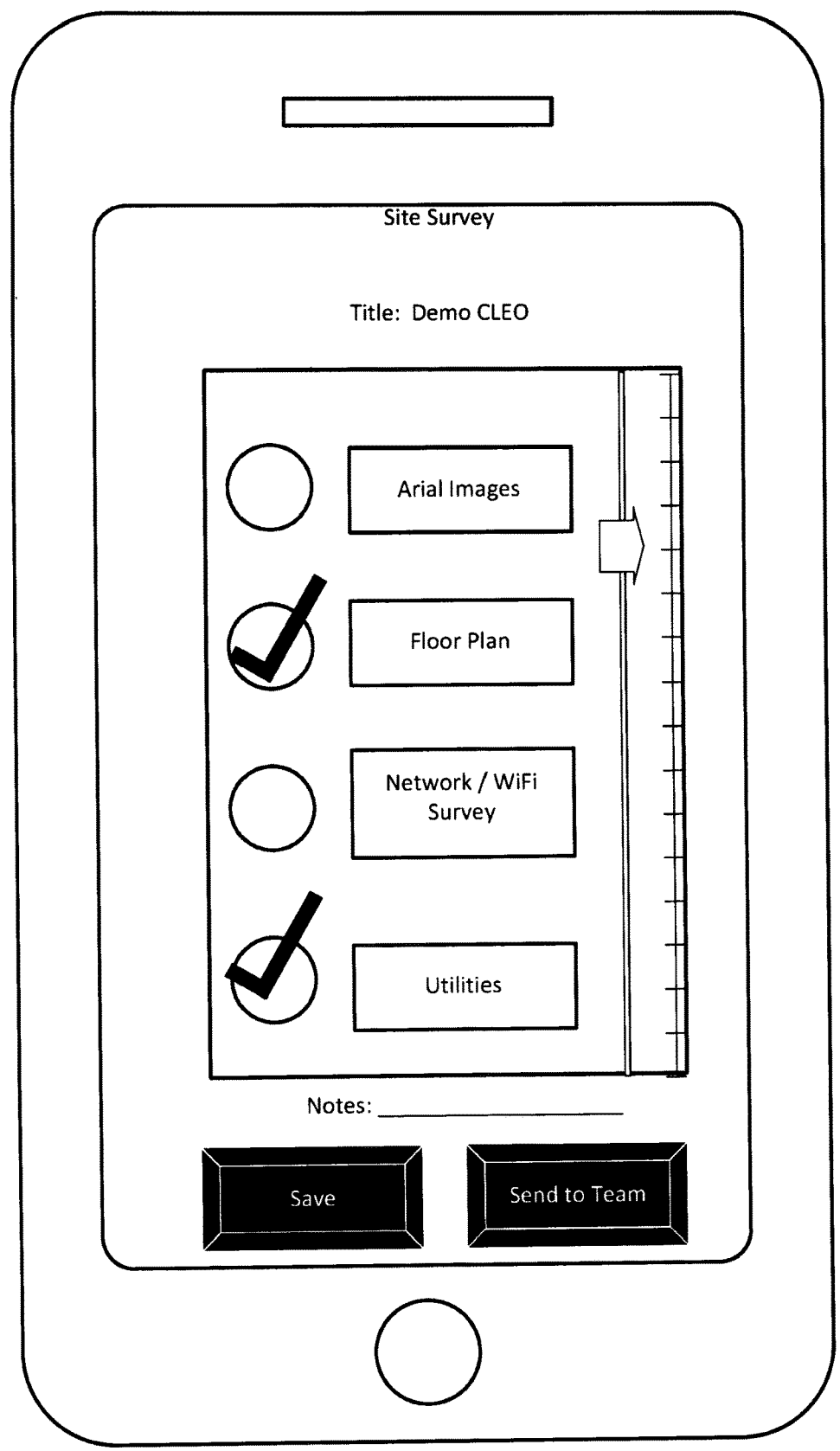
FIG. 14 is a graphical illustration of an exemplary site survey with various sections displayed on the client application screen in accordance with an embodiment of the present system and method.

As illustrate in FIG. 14, upon completion of the site survey section 31, the client application on the associated handheld device 24 transmits the site survey section 31 to the team member 9*b* for review, approval and for transmission to the application server 28 for generation of the site survey report 40 based upon the preconfigured report template 44.

Another embodiment of the computer-implemented method involves generating a listing of site surveys along with creating the site surveys 30 based on a list of geographic features associated with the locations affected by an event. The listing of site surveys 30 may be generated from the library of previously configured site survey templates 54. Alternatively, the list of site surveys may be generated based on specific features of each geographic site.

The listing of site surveys may be grouped and arranged around a specified geographic area or based on a geographic location of an assigned handheld device 24 as illustrated in FIG. 12. In addition, the client application may provide directional instructions through the assigned handheld device 24 to facilitate transportation of the handheld device 24 to the target location as illustrated in FIG. 9. Once the handheld device 24 reaches the targeted destination, the handheld device 24 may be used to obtain survey data 32 as well as providing real-time status updates through the client application to a manager 6 regarding the completion of the site survey 30. The navigational feature on the client application may utilize a standard mapping interface to provide directional instructions, such as Google Maps. The client application may also sort the assigned site surveys based upon an optimization algorithm.

By way of illustration, the optimization algorithm my involve finding the site surveys 30 needed within a geographic range and then generate a directional listing optimized to reduce the driving time between the assigned site surveys 30. The navigational feature may also redirect the survey user 8 as required and illustrate the navigation using a digital map. In addition, the system 10 may generate an event log or alarm based upon a preconfigured deviation from the prescribed route and would provide for real-time logging of survey data 32 received from the handheld device 24 based upon a site survey command 70 received from a remote computer 18. Upon completion of the site survey 30, survey data 32 would be sent through the client application from the handheld device 24 to the application server 28 and to the report server 26 for generation of the pre-configured report 40 along with making a copy of the survey data 32 available for retrievable storage within the historical datastore 37.

The system 10 provides a historical datastore 37 for the retrievable storage of historical site survey data 37 which is organized, classified and retrievably stored based on the various geographic features associated with the surveyed site. The historical site surveys 56 are divided into sections which can be classified according to various configured parameters which can be made accessible through the client application to authorized handheld device 24 users.

As illustrated in FIG. 10 the report user 7 can send a variety of commands from the report such as the activation command 70. In addition, the report user 7, the team leader 9*b* or managing user 6 can also send additional commands like an electronic, textual or verbal command to the responding team member 9*b* via the handheld device 24*b* which directs the handheld device 24 to perform a certain action, like navigate to a certain location, take an image, take a video, change the display or capture additional information using one of the available input mechanisms 20*d* or integrated sensors on the handheld device 24. In addition, the report user 7 may also request access to available real-time survey data using one of the sensors 20. In this way, the report user 7, team leader 24*a*, or managing user can obtain additional survey data from multiple sources at a specified time or upon the occurrence of a specified event to make an informed decision in response to an event or occurrence.

Generally, the network of sensory devices 20 and handheld devices 24 surrounding a site may be in communication in a variety of known ways including WLAN, WAN, LAN, Wi-Fi, Bluetooth, RF, ad-hoc, RFID or as a self-organized mobile network (SOMNET) with each handheld device 24 assigned to a specific role associated with the site.

In some cases, the handheld device 24 is associated with a survey user 8 who is tasked with completing a site survey. In other cases, the system 10 utilizes a tiered team arrangement as illustrated in FIG. 1. In the team arrangement at least one handheld device 24*a* is associated with a team leader 9 which transmits and receives sections of a site survey, after aggregating the received site survey sections 31 from a team member 9*b*, and upon review and approval of the received site survey sections 31, the site survey data 32 may be transmitted from the team leader's handheld device 24*a* to the application server 28 for processing and storage. Generally, each site survey team includes at least one team leader 9 with a leading device 24a and one team member 9b with a team handheld device 24b. In the tiered or team arrangement the leading handheld device 24a is in communication with the admin server 25 and a remote computing device 18 associated with a managing member performing the function of the report manager 6 located at a remote location.

The manager 6 or team leader 9 can also initiate a site survey command 70 which is transmitted via the associated network to the handheld device 24a to activate a pre-configured real-time sensor 20 associated with a responding team member's 9b handheld device 24b or in communication with a responding team member's 9b handheld device 24b. The site survey command 70 generally allows for the capture and transmittal of real-time sensory information from a sensor 20, a team member 9b or all team members 9b. The real-time sensor 20 may include, but is not limited to, sensors 20 such as a visual sensor 21, temperature sensor 22, location sensor 82, heart-rate sensor, pulse sensor, audio sensor, visual sensor or auxiliary sensor associated with the handheld device 24 or other computing device 18.

In a first responder situation, various responders may arrive at a particular location in response to a particular event. In these situations, the ability to provide real-time information along with historical site survey data can be critical to saving lives and neutralizing threats. The system 10 provides various users with the ability to communicate with each other and obtain real-time sensory data along with historical site surveys 56 to coordinate an appropriate response. In the case of an active shooter for example, the first responders may elect to utilize the tiered arrangement with one or more users being the designated leader and other users being designated as a team member. The team leader 9 may configure the tiered arrangement using a local client application accessible on the team member's leading device 24a.

In a first responder exemplary embodiment using the client application, the team leaders' 9 leading device 24a, will have access to historical survey data 36 from the historical datastore 37 by logging on to the system 10, entering their user credentials and sending a request to the application server 28 through the wireless access point 17. Upon authentication by the system 10, the system 10 obtains the position of the leading device 24a and transmits a site survey report 40 populated with historical site survey data 36 associated with a site survey based on the leading device 24a position. Alternatively, the team member 9b may manually select the historical site survey from a list of historical site surveys displayed on the leading device 24a. Using the leading device 24a, the team leader 9, then selects which portions of the report 40 to transmit to other team member's devices 24b associated with the other team members 9b. Each survey device 19 can also obtain real-time sensory data, including position data 32a, video and audio data 32f, 32h and ambient data 32m which can be captured and transmitted to the leading device 24a or to a remote manager 6 monitoring the situation from a remote location and providing additional guidance or instructions through the application server to the survey devices 19. In this way, the system 10 provides access to historical site surveys 56 in order to facilitate a timely and coordinated response.

The first responder scenario is one embodiment of the tiered/team arrangement. As previously described, the leader handheld device 24a is associated with a leading first responder who signs into the client application 60 to access historical site data 36 from the a list of historical site surveys 56 from the historical datastore 37 and using the client application 60 creates, a response team comprised of team members each with a member handheld device 24b which is added to an administrative screen on the client application for networked communication by the team leader's 9a leading handheld device 24a.

Figure 15:
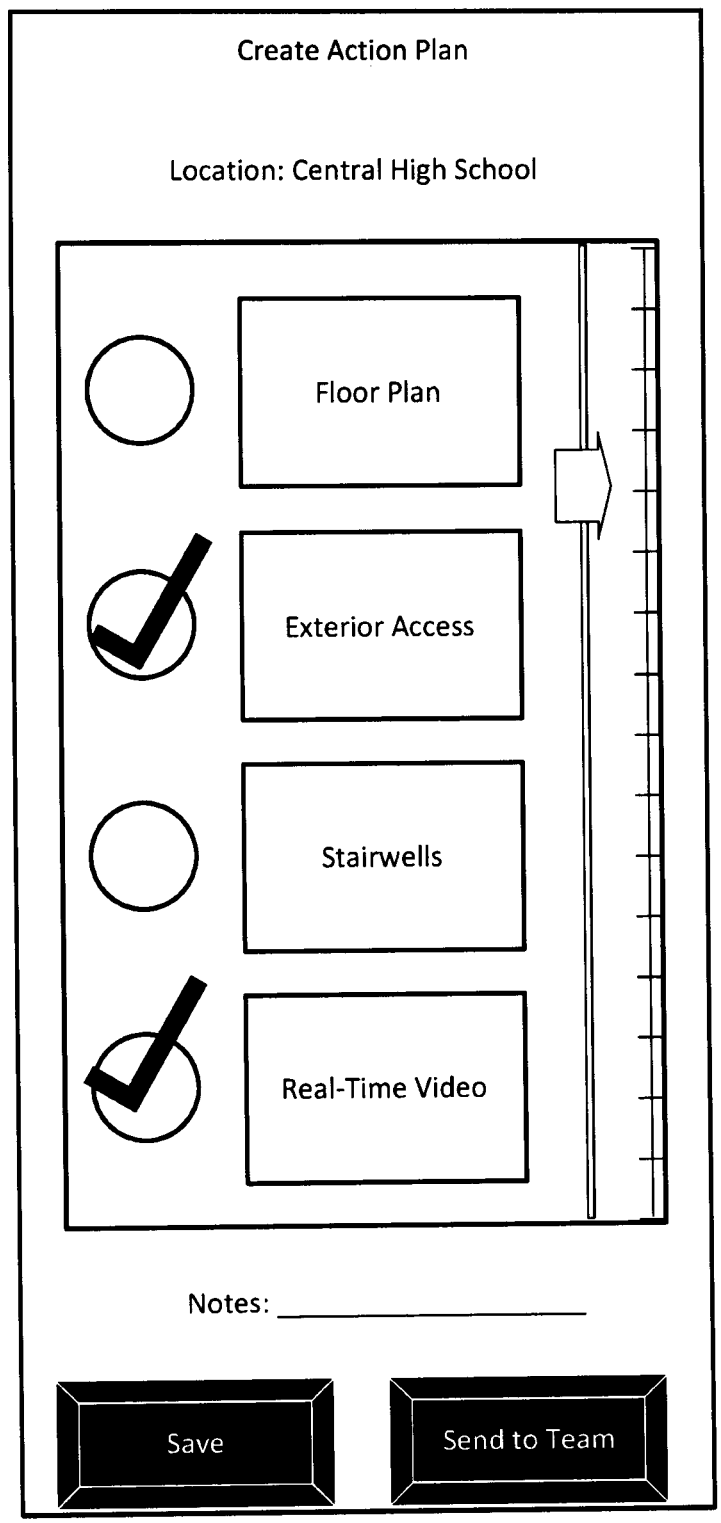
FIG. 15 is a graphical illustration of an exemplary create an action plan screen displayed on the client application screen in accordance with an embodiment of the present system and method.

Once the team has been created, the team leader 9a can create an appropriate response action plan as illustrated in FIG. 15 using at least a portion of the received historical data 37. In addition, the historical site survey 56 may provide additional information about any available survey devices 19 which may be in networked communication with the application server 28. The response action plan is functionally similar to creating a site survey on the client application 60, where an action plan can be created, using for example, the historical site survey 56. The action plan can be created in different sections and the different sections can be forwarded to the member handheld device 24b of various team members 9b for further guidance by the handheld device 24b in communication with the leading handheld device 24a of the team leader 9a.

In another exemplary embodiment of an executive detail survey and action plan can be created using the application server 28 from a library of template surveys 51 which can also include a library of template sections 52 used to dynamically create site surveys 30 based on various features of the site to be surveyed or various data types to be acquired or available survey devices 19 including any available sensors 20.

In an exemplary method for practicing the computer-implemented site survey, control of each section of the site survey is transmitted to a specific handheld device during the site survey. Upon completion of the site survey, survey section control along with the site-specific survey data is then transmitted to the team leader or a managing member for review and approval. During the site survey, team members can use their handheld device for recording data. After completion of the site survey, the team leader can send a site survey command 70 to any configured site survey devices 19. During the site survey 30, the team member 9b can utilize various site survey sensors 20 including the handheld device 24 to obtain site survey data 32. Upon completion of the site survey 30, the team member 9b handheld device 24b or a remote manager 6 can initiate an activation/completion command 72 to the designate survey device 19 commanding the survey device 19 to transmit any site survey data 32 along with control of the site survey 30 to the initiating device for approval. Upon approval of a site survey section 31 by the team leader 9, another site survey section 31 is transmitted to the team member until the site survey 30 is complete. If the team member's survey section 31 is rejected, the site survey section 31 may be resent to the team member 9b for completion.

Access to a survey template 54 or survey template section 55 may be limited by classifying the survey 30 or section 31. Once classified, only a user with sufficient clearance can complete or review the captured survey data 32. In addition, once classified, storing the site survey data may be limited to datastores with sufficient encryption and security. By way of example, a radio button or checkbox may be placed next to the designated site survey field to be encrypted. By checking the box, the survey data 32 associated with the field would be designated as classified limiting access and designating the storage and transmission of the survey data 32 to be encrypted or otherwise encoded for secured transmission and storage using known encryption methodology. In addition, the storage of the encrypted data may be limited to a specific database which is encrypted using known encryption/encoding methodology. Encryption can be configured in advance of the site survey 30 by the application In addition, the survey data 32 or portions of the survey data 32 may be encrypted during transmission and storage to the remote datastore 34. In an encrypted embodiment, the data collection process occurs much as it does in the non-encrypted manner with the use of survey devices 19 which collects and stores the survey data 32. However, in the encrypted embodiment, the survey data 32 may be encoded for transmission by the client application and encoded by the datastore 34 for encrypted storage. Once the encrypted data is received, it may be decrypted using the decryption key provided by the client application and stored locally for display and utilization or re-encoded. Once collected, the sensitive site survey data 32 can be transmitted via encrypted communication to the remote computing device 18, application server 25, or datastore 34 designated for receipt of the classified or sensitive survey data 32. In addition, the encrypted communication can be transmitted to another handheld devices 24, or a team leader's leading handheld device 24a, for review, approval and if appropriate, further transmission via system encryption.

Based on the system configuration, the collected survey data 32 may be classified based on the user, the survey device 19, the survey 30, the survey section 31, the survey location or the user classification. This may include user or device authorization to access confidential or secret information. In addition, various system components, including, but not limited to the system users like the report user 7, the admin user 5, the survey user 8, the team leader 9, the user's affiliated organization, the survey device 19, the sensor 20, the handheld device 24, the admin server 25 or the remote computing device 18 may be classified according to the ability of the device or user to access, retrieve, display or store various categories of site survey information, including sensitive, confidential or secret information. This classification may also extend to the survey device 19 or system component or hardware. Based on the classification the system 10 may encrypt the information, data or communication containing the designated sensitive, confidential or secret survey data 32 as it is transmitted from one of the survey devices 19 to another system component.

As is evident from the foregoing abbreviated description, certain aspects of the present invention are not limited by the particular details of the examples illustrated herein, and it is therefore contemplated that other modifications and applications, or equivalents thereof will occur to those skilled in the art.

One of ordinary skill in the art will appreciate that the methods and system of the present invention are capable of being distributed in the form of a computer readable medium of instructions and a variety of forms and that the present invention applies equally regardless of the particular type of single bearing media actually used to carry-out the distribution.

The many features and advantages of the invention are apparent from the detailed specification, and thus, it is intended by the appended claims in any non-provisional application to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed and desired to be secured by Letters Patent:

1. A site survey system comprising:
an application server for generating and recording a plurality of site surveys;
each of said site surveys including a plurality of site survey sections;
at least one of said site surveys corresponding to a preconfigured site survey template;
said preconfigured site survey template including a plurality of sections each said section corresponding to a survey section template;
at least one of said sections corresponding to a site specific feature;
a report server in communication with said application server and configured for transmitting at least one report to a plurality of system users;
said report including a plurality of report sections corresponding to said plurality of site survey sections;
a data store in communication with said application server and configured for storing said plurality of preconfigured site survey templates;
at least one said site survey being generated dynamically by said application server from one of said site survey templates in response to a selection of at least one of said site-specific feature;
a communication interface allowing communication between a survey device and said application server;
a client application associated with said survey device and configured for receiving said dynamically generated site survey;
survey data captured by said survey device using said client application and transmitted to said application server as a completed site survey using said communication interface;
a report generated by said report server with survey data received from said survey device; and
said survey device further comprising:
an input mechanism associated with at least one of said site specific feature;
said input mechanism configure for receiving said survey data;
a processor for processing said client application and associating said received survey data with at least one section of said dynamically generated site survey;
a storage media for storing said survey data; and
a transmitter in communication with said client application wherein said completed site survey is transmitted from said client application.

2. The site survey system according to claim 1 wherein each said site survey section template is associated with at least one said site-specific feature.

3. The site survey system according to claim 1 further comprising a library of a plurality of historical site surveys which are accessible to said survey device.

4. The site survey system according to claim 3 wherein said historical site survey is copied from said completed site survey.

5. The site survey system according to claim 1 further comprising a survey leader device in communication with said survey device and said application server wherein said survey leader device is configured for receiving survey data from said survey device.

6. The site survey system according to claim 1 wherein said application server can verify said transmitted survey data.

7. The site survey system according to claim 1 wherein said application server sorts said received survey data based upon a previously provided sorting criteria.

8. The site survey system according to claim 1 further comprising a survey leader device in communication with said survey device and said application server wherein said survey leader device is configured for receiving survey data from said survey device.

9. A site survey system comprising:
- an application server configured for dynamically generating and recording a plurality of site surveys;
    - at least one of said site surveys including a plurality of site survey sections;
    - at least one of said site survey sections corresponding to a preconfigured site survey section template;
- at least one of said site survey section templates corresponding to at least one desired data type;
- a report server in communication with said application server and configured for transmitting a plurality of reports to a plurality of system users each of said report including survey data transmitted to said application server from at least one survey device;
- at least one of said reports including a plurality of report sections corresponding to said plurality of site survey sections;
- a data store in communication with said application server and capable of storing a plurality of said site survey section templates,
    - at least one site survey dynamically generated by said application server from at least one of said site survey section templates in response to a selection of at least one desired data type;
    - a communication interface allowing communication between said survey device and the application server;
- a client application associated with said survey device and configured for receiving said dynamically generated site survey;
    - survey data captured by said survey device using said client application and transmitted to the application server using said communication interface;
    and
    said survey device further comprising:
    - an input mechanism associated with at least one of said desired data type and configure for receiving said survey data;
    - a storage media for storing said survey data;
    - a transmitter in communication with said client application for transmission of said completed site survey; and
- a processor for processing said client application and associating said received survey data with at least one dynamically generated site survey.

10. A computer-implemented method for dynamically generating a site survey comprising the steps of:
- providing an application server with a processor, a data store and a communications network for networked communications with a client application;
- providing a listing of a plurality of site survey types;
- providing a listing of a plurality of site survey devices;
- providing a listing of datatypes wherein each of said datatype corresponds to at least one site survey device selected from said listing of site survey devices;
- associating each site survey type selected from said listing of site survey types with at least one site survey device;
- providing a template library with a plurality of electronic site survey sections,
- dynamically generating at least one electronic site survey from said plurality of electronic site survey sections;
- including a plurality of electronic site survey sections in at least one of said electronic site surveys;
- associating at least one of said electronic site survey sections to a preconfigured electronic site survey section template;
- associating at least one of said electronic site survey section templates to at least one of said data types
- providing a handheld device with a processor, an input mechanism, a transmitter and a storage media;
- initiating said client application on said handheld device for communication with said application server;
- transmitting said electronic site survey to said handheld device through said client application;
- collecting a plurality of site survey data including sensory data through said client application on said handheld device;
- transmitting said plurality of site survey data from a plurality of said handheld devices to said application server;
- retrievably storing site survey data from said plurality of said handheld devices by said application server on said data store;
- generating a report, including site survey data from a plurality of handheld devices, based on a preconfigured report template;
- including a plurality of report sections in at least one report, wherein each of said report sections correspond to at least one of said electronic site survey sections; and
- transmitting said generated report, including site survey data to the remote computer.

* * * * *